(12) United States Patent
Kobel et al.

(10) Patent No.: US 12,004,051 B2
(45) Date of Patent: Jun. 4, 2024

(54) ONBOARD DOCUMENTATION SYSTEM AND METHODS

(71) Applicant: Oshkosh Corporation, Oshkosh, WI (US)

(72) Inventors: Korry D. Kobel, Oshkosh, WI (US); Fredric L. Yutzy, Oshkosh, WI (US); Stefan Eshleman, Oshkosh, WI (US); Dan Adamson, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 17/576,433

(22) Filed: Jan. 14, 2022

(65) Prior Publication Data

US 2022/0229872 A1   Jul. 21, 2022

Related U.S. Application Data

(60) Provisional application No. 63/137,996, filed on Jan. 15, 2021, provisional application No. 63/138,015, (Continued)

(51) Int. Cl.
*G06F 16/93* (2019.01)
*B66F 9/075* (2006.01)
(Continued)

(52) U.S. Cl.
CPC ............. *H04W 4/08* (2013.01); *B66F 9/0755* (2013.01); *B66F 9/07581* (2013.01); *B66F 9/12* (2013.01);
(Continued)

(58) Field of Classification Search
CPC ....... H04W 4/08; H04W 76/15; H04W 4/029; H04W 4/30; H04W 76/23; H04W 76/14;
(Continued)

(56) References Cited

U.S. PATENT DOCUMENTS 3,009,747 A  11/1961 Pitzer
4,099,761 A  7/1978 Cullings
(Continued)

FOREIGN PATENT DOCUMENTS

CN  111126522 A  5/2020
DE  10 2007 020 182 A1  10/2008
(Continued)

OTHER PUBLICATIONS

Notification of Transmittal of the International Search Report and the Written Opinion of the International Search Authority, or the Declaration issued in connection with PCT Appl. Ser. No. PCT/US2022/012603 dated Jul. 6, 2022 (27 pages).
(Continued)

*Primary Examiner* — Hau H Hoang
(74) *Attorney, Agent, or Firm* — Foley & Lardner LLP

(57) ABSTRACT

An onboard documentation system for a lift device comprises a controller coupled to the lift device, the controller configured to receive documentation associated with the lift device, store the documentation locally on the lift device, receive a request for the documentation from a user, and provide the documentation stored locally on the lift device to the user in response to the request.

20 Claims, 16 Drawing Sheets

Related U.S. Application Data filed on Jan. 15, 2021, provisional application No. 63/138,003, filed on Jan. 15, 2021, provisional application No. 63/138,016, filed on Jan. 15, 2021, provisional application No. 63/137,867, filed on Jan. 15, 2021, provisional application No. 63/137,978, filed on Jan. 15, 2021, provisional application No. 63/137,893, filed on Jan. 15, 2021, provisional application No. 63/138,024, filed on Jan. 15, 2021, provisional application No. 63/137,955, filed on Jan. 15, 2021, provisional application No. 63/137,950, filed on Jan. 15, 2021.

(51) Int. Cl.
| | |
|---|---|
| *B66F 9/12* | (2006.01) |
| *B66F 11/04* | (2006.01) |
| *G05B 19/4155* | (2006.01) |
| *G05D 1/00* | (2006.01) |
| *G06F 3/0482* | (2013.01) |
| *G06F 3/0484* | (2022.01) |
| *G06F 3/0488* | (2022.01) |
| *G06Q 10/20* | (2023.01) |
| *G06Q 30/0601* | (2023.01) |
| *G07C 5/00* | (2006.01) |
| *G07C 5/08* | (2006.01) |
| *G08B 3/00* | (2006.01) |
| *G08B 5/36* | (2006.01) |
| *G08B 7/06* | (2006.01) |
| *G08B 21/18* | (2006.01) |
| *H04L 67/52* | (2022.01) |
| *H04L 67/63* | (2022.01) |
| *H04W 4/029* | (2018.01) |
| *H04W 4/08* | (2009.01) |
| *H04W 4/30* | (2018.01) |
| *H04W 4/40* | (2018.01) |
| *H04W 4/70* | (2018.01) |
| *H04W 8/00* | (2009.01) |
| *H04W 48/16* | (2009.01) |
| *H04W 76/14* | (2018.01) |
| *H04W 76/15* | (2018.01) |
| *H04W 76/23* | (2018.01) |
| *H04W 4/35* | (2018.01) |
| *H04W 4/80* | (2018.01) |
| *H04W 84/12* | (2009.01) |
| *H04W 84/18* | (2009.01) |
| *H04W 88/08* | (2009.01) |

(52) U.S. Cl.
CPC ........ *B66F 11/046* (2013.01); *G05B 19/4155* (2013.01); *G05D 1/0022* (2013.01); *G05D 1/0027* (2013.01); *G05D 1/0044* (2013.01); *G05D 1/005* (2013.01); *G06F 3/0482* (2013.01); *G06F 3/0484* (2013.01); *G06F 3/0488* (2013.01); *G06F 16/93* (2019.01); *G06Q 10/20* (2013.01); *G06Q 30/0611* (2013.01); *G06Q 30/0631* (2013.01); *G06Q 30/0641* (2013.01); *G07C 5/006* (2013.01); *G07C 5/0825* (2013.01); *G08B 3/00* (2013.01); *G08B 5/36* (2013.01); *G08B 7/06* (2013.01); *G08B 21/18* (2013.01); *H04L 67/52* (2022.05); *H04L 67/63* (2022.05); *H04W 4/029* (2018.02); *H04W 4/30* (2018.02); *H04W 4/40* (2018.02); *H04W 4/70* (2018.02); *H04W 8/005* (2013.01); *H04W 48/16* (2013.01); *H04W 76/14* (2018.02); *H04W 76/15* (2018.02); *H04W 76/23* (2018.02); *G05B 2219/45049* (2013.01); *H04W 4/35* (2018.02); *H04W 4/80* (2018.02); *H04W 84/12* (2013.01); *H04W 84/18* (2013.01); *H04W 88/08* (2013.01); *H04W 88/085* (2013.01)

(58) Field of Classification Search
CPC ......... H04W 4/40; H04W 48/16; H04W 4/35; H04W 4/80; H04W 84/12; H04W 84/18; H04W 88/08; H04W 88/085; G06F 16/93; G06F 3/0482; G06F 3/0484; G06F 3/0488; H04L 67/63; H04L 67/52; B66F 9/07581; B66F 9/12; B66F 11/046; G05B 19/4155; G05B 2219/45049; G05D 1/0022; G05D 1/0027; G05D 1/0044; G05D 1/005; G05D 2201/0216; G06Q 10/20; G06Q 30/0611; G06Q 30/0631; G06Q 30/0641; G07C 5/006; G07C 5/0825; G08B 3/00; G08B 5/36; G08B 7/06; G08B 21/18

See application file for complete search history.

(56) References Cited

U.S. PATENT DOCUMENTS

| | | |
|---|---|---|
| 4,178,591 A | 12/1979 | Geppert |
| 4,315,652 A | 2/1982 | Barwise |
| 4,426,110 A | 1/1984 | Mitchell et al. |
| 4,461,608 A | 7/1984 | Boda |
| 4,572,567 A | 2/1986 | Johnson |
| 4,573,728 A | 3/1986 | Johnson |
| 4,810,020 A | 3/1989 | Powell |
| 5,026,104 A | 6/1991 | Pickrell |
| 5,092,731 A | 3/1992 | Jones et al. |
| 5,209,537 A | 5/1993 | Smith et al. |
| 5,330,242 A | 7/1994 | Lucky, Sr. |
| 5,730,430 A | 3/1998 | Hodson et al. |
| 5,919,027 A | 7/1999 | Christenson |
| 5,934,858 A | 8/1999 | Christenson |
| 5,934,867 A | 8/1999 | Christenson |
| 5,938,394 A | 8/1999 | Christenson |
| 5,951,235 A | 9/1999 | Young et al. |
| 5,967,731 A | 10/1999 | Brandt |
| 5,984,609 A | 11/1999 | Bartlett |
| 6,033,176 A | 3/2000 | Bartlett |
| 6,062,803 A | 5/2000 | Christenson |
| 6,089,813 A | 7/2000 | McNeilus et al. |
| 6,120,235 A | 9/2000 | Humphries et al. |
| 6,123,500 A | 9/2000 | McNeilus et al. |
| 6,210,094 B1 | 4/2001 | McNeilus et al. |
| 6,213,706 B1 | 4/2001 | Christenson |
| 6,224,318 B1 | 5/2001 | McNeilus et al. |
| 6,264,013 B1 | 7/2001 | Hodgins |
| 6,315,515 B1 | 11/2001 | Young et al. |
| 6,336,783 B1 | 1/2002 | Young et al. |
| 6,350,098 B1 | 2/2002 | Christenson et al. |
| 6,447,239 B2 | 9/2002 | Young et al. |
| 6,474,928 B1 | 11/2002 | Christenson |
| 6,565,305 B2 | 5/2003 | Schrafel |
| 7,070,382 B2 | 7/2006 | Pruteanu et al. |
| 7,207,610 B1 | 4/2007 | Kauppila |
| 7,284,943 B2 | 10/2007 | Pruteanu et al. |
| 7,556,468 B2 | 7/2009 | Grata |
| 7,559,735 B2 | 7/2009 | Pruteanu et al. |
| 7,721,857 B2 | 5/2010 | Harr |
| 7,878,750 B2 | 2/2011 | Zhou et al. |
| 7,934,758 B2 | 5/2011 | Stamey et al. |
| 8,182,194 B2 | 5/2012 | Pruteanu et al. |
| 8,215,892 B2 | 7/2012 | Calliari |
| 8,360,706 B2 | 1/2013 | Addleman et al. |
| 8,540,475 B2 | 9/2013 | Kuriakose et al. |
| 8,655,505 B2 | 2/2014 | Sprock et al. |
| 8,807,613 B2 | 8/2014 | Howell et al. |
| 8,833,823 B2 | 9/2014 | Price et al. |

(56) References Cited

U.S. PATENT DOCUMENTS

| | | |
|---|---|---|
| 9,028,193 B2 | 5/2015 | Goedken |
| 9,216,856 B2 | 12/2015 | Howell et al. |
| 9,387,985 B2 | 7/2016 | Gillmore et al. |
| 9,624,033 B1 | 4/2017 | Price et al. |
| 9,694,776 B2 | 7/2017 | Nelson et al. |
| 9,880,581 B2 | 1/2018 | Kuriakose et al. |
| 9,981,803 B2 | 5/2018 | Davis et al. |
| 10,018,171 B1 | 7/2018 | Breiner et al. |
| 10,035,648 B2 | 7/2018 | Haddick et al. |
| 10,196,205 B2 | 2/2019 | Betz et al. |
| 10,221,012 B2 | 3/2019 | Hund, Jr. |
| 10,457,533 B2 | 10/2019 | Puszkiewicz et al. |
| 10,899,538 B2 | 1/2021 | Nelson et al. |
| 2002/0070862 A1 | 6/2002 | Francis et al. |
| 2002/0079713 A1 | 6/2002 | Moilanen et al. |
| 2002/0123345 A1 | 9/2002 | Mahany et al. |
| 2003/0158640 A1* | 8/2003 | Pillar ............ G01M 17/00 701/29.4 |
| 2005/0140154 A1 | 6/2005 | Vigholm et al. |
| 2005/0149920 A1* | 7/2005 | Patrizi ............ G06F 8/73 717/168 |
| 2007/0213869 A1 | 9/2007 | Bandringa et al. |
| 2009/0005928 A1* | 1/2009 | Sells ............ G07C 5/0808 701/31.7 |
| 2009/0049441 A1* | 2/2009 | Mii ............ B66B 1/34 717/173 |
| 2009/0099897 A1 | 4/2009 | Ehrman et al. |
| 2009/0101447 A1 | 4/2009 | Durham et al. |
| 2010/0179844 A1 | 7/2010 | Lafergola et al. |
| 2011/0081193 A1 | 4/2011 | Nilsson |
| 2012/0046809 A1 | 2/2012 | Wellman |
| 2013/0057007 A1 | 3/2013 | Howell et al. |
| 2013/0127611 A1 | 5/2013 | Bernstein et al. |
| 2013/0132140 A1 | 5/2013 | Amin et al. |
| 2013/0240300 A1 | 9/2013 | Fagan et al. |
| 2014/0278621 A1 | 9/2014 | Medwin et al. |
| 2014/0312639 A1 | 10/2014 | Petronek |
| 2015/0376869 A1 | 12/2015 | Jackson |
| 2016/0121490 A1 | 5/2016 | Ottersland |
| 2016/0208992 A1 | 7/2016 | Parsons |
| 2016/0272471 A1 | 9/2016 | Jaipaul |
| 2016/0304051 A1* | 10/2016 | Archer ............ B60R 25/08 |
| 2016/0318438 A1 | 11/2016 | Wadell |
| 2017/0269608 A1 | 9/2017 | Chandrasekar et al. |
| 2018/0065544 A1 | 3/2018 | Brusco |
| 2018/0143734 A1 | 5/2018 | Ochenas et al. |
| 2018/0151037 A1 | 5/2018 | Morgenthau et al. |
| 2019/0246060 A1 | 8/2019 | Tanabe et al. |
| 2020/0134955 A1 | 4/2020 | Kishita |
| 2020/0207166 A1 | 7/2020 | Froehlich |
| 2020/0317489 A1 | 10/2020 | Bhatia et al. |
| 2021/0023985 A1 | 1/2021 | Stadnyk |
| 2021/0055178 A1 | 2/2021 | Hinderling et al. |
| 2021/0087035 A1 | 3/2021 | Yip et al. |
| 2021/0232137 A1 | 7/2021 | Whitfield et al. |
| 2021/0250178 A1 | 8/2021 | Herman et al. |
| 2022/0156921 A1 | 5/2022 | Humpston et al. |
| 2022/0221365 A1 | 7/2022 | Mahurkar et al. |

FOREIGN PATENT DOCUMENTS

| | | |
|---|---|---|
| EP | 1 136 433 A2 | 9/2001 |
| EP | 3 112 312 A1 | 1/2017 |
| EP | 3 173 369 A1 | 5/2017 |
| EP | 3 200 482 A1 | 8/2017 |
| EP | 3 896 024 A1 | 10/2021 |
| JP | H1059698 A | 3/1998 |
| JP | 2016-159996 A | 9/2016 |
| JP | 2020-128270 A | 8/2020 |
| JP | 2021-052920 A | 4/2021 |
| WO | WO-01/30671 A2 | 5/2001 |
| WO | WO-2011/019872 A2 | 2/2011 |
| WO | WO-2012/109444 A2 | 8/2012 |
| WO | WO-2020/121613 A1 | 6/2020 |

OTHER PUBLICATIONS

Notification of Transmittal of the International Search Report and the Written Opinion of the International Search Authority, or the Declaration issued in connection with PCT Appl. Ser. No. PCT/US2022/012628 dated Jul. 6, 2022 (27 pages).

International Search Report and Written Opinion issued in connection with PCT Appl. Ser. No. PCT/US2022/012610 dated Jun. 21, 2022 (19 pages).

Invitation to Pay Additional Fees issued in connection with PCT Appl. Ser. No. PCT/US2022/012610 dated Apr. 28, 2022 (136 pages).

Invitation to Pay Additional Fees issued in connection with PCT Appl. Ser. No. PCT/US2022/012628 dated May 13, 2022 (134 pages).

Suzuki et al., "Teleoperation of Multiple Robots through the Internet", IEEE International Workshop on Robot and Human Communication, published 1996, pp. 84-89 (Year: 1996).

\* cited by examiner

ONBOARD DOCUMENTATION SYSTEM AND METHODS

CROSS-REFERENCE TO RELATED PATENT APPLICATIONS

This application claims the benefit of U.S. Provisional Application No. 63/137,950, filed on Jan. 15, 2021, U.S. Provisional Application No. 63/137,955, filed on Jan. 15, 2021, U.S. Provisional Application No. 63/137,996, filed on Jan. 15, 2021, U.S. Provisional Application No. 63/138,003, filed on Jan. 15, 2021, U.S. Provisional Application No. 63/138,015, filed on Jan. 15, 2021, U.S. Provisional Application No. 63/138,016, filed on Jan. 15, 2021, U.S. Provisional Application No. 63/138,024, filed on Jan. 15, 2021, U.S. Provisional Application No. 63/137,867, filed on Jan. 15, 2021, U.S. Provisional Application No. 63/137,893, filed on Jan. 15, 2021, and U.S. Provisional Application No. 63/137,978, filed on Jan. 15, 2021, all of which are incorporated herein by reference in their entireties.

BACKGROUND

Work equipment and machines such as lifts and telehandlers sometimes require tracking, tasking, monitoring, and servicing at a worksite. Manufacturers, purchasers, managers, operators, and maintainers of working machines typically rely on a wide variety of decentralized media, systems, applications, and methods to store, retrieve, and display documents related to each piece of equipment.

SUMMARY

One exemplary embodiment relates to an onboard documentation system for a lift device. The onboard documentation system includes a controller coupled to the lift device. The controller is configured to receive documentation associated with the lift device, store the documentation locally on the lift device, receive a request for the documentation from a user, and provide the documentation stored locally on the lift device to the user in response to the request.

Another embodiment relates to a method for providing onboard documentation associated with a lift device. The method includes providing a lift device including a local memory device. The method further includes storing on the local memory device documentation associated with the lift device, receiving from a user a request for the documentation at the local memory device, retrieving the documentation from the local memory device, and providing the documentation to the user in response to the request.

Another embodiment relates to lift device with an onboard documentation system. The lift device includes a chassis, a lifting element coupled to the chassis, a prime mover configured to power the lifting element, and a sensor coupled to the chassis and position to monitor the operation of the lift device. The lifting device also includes a non-transitory computer-readable storage medium having instructions stored thereon that, upon execution by a processor of a controller configured to control the lift device, cause the processor to establish a local mesh network with one or more work machines at a worksite, determine, using the sensor, a state of the lift device, receive documentation associated with the lift device via the local mesh network, store the documentation on a local memory device of the lift device, associate a portion of the documentation with the state of the lift device and an access code, receive a request for the portion of the documentation from a user, determine if a user access code contained in the request matches the access code associated with the portion of the document, and provide the portion of the document from the local memory device to the user in response to the request.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The invention will become more fully understood from the following detailed description taken in conjunction with the accompanying drawings wherein like reference numerals refer to like elements, in which.

DETAILED DESCRIPTION

Figure 1:
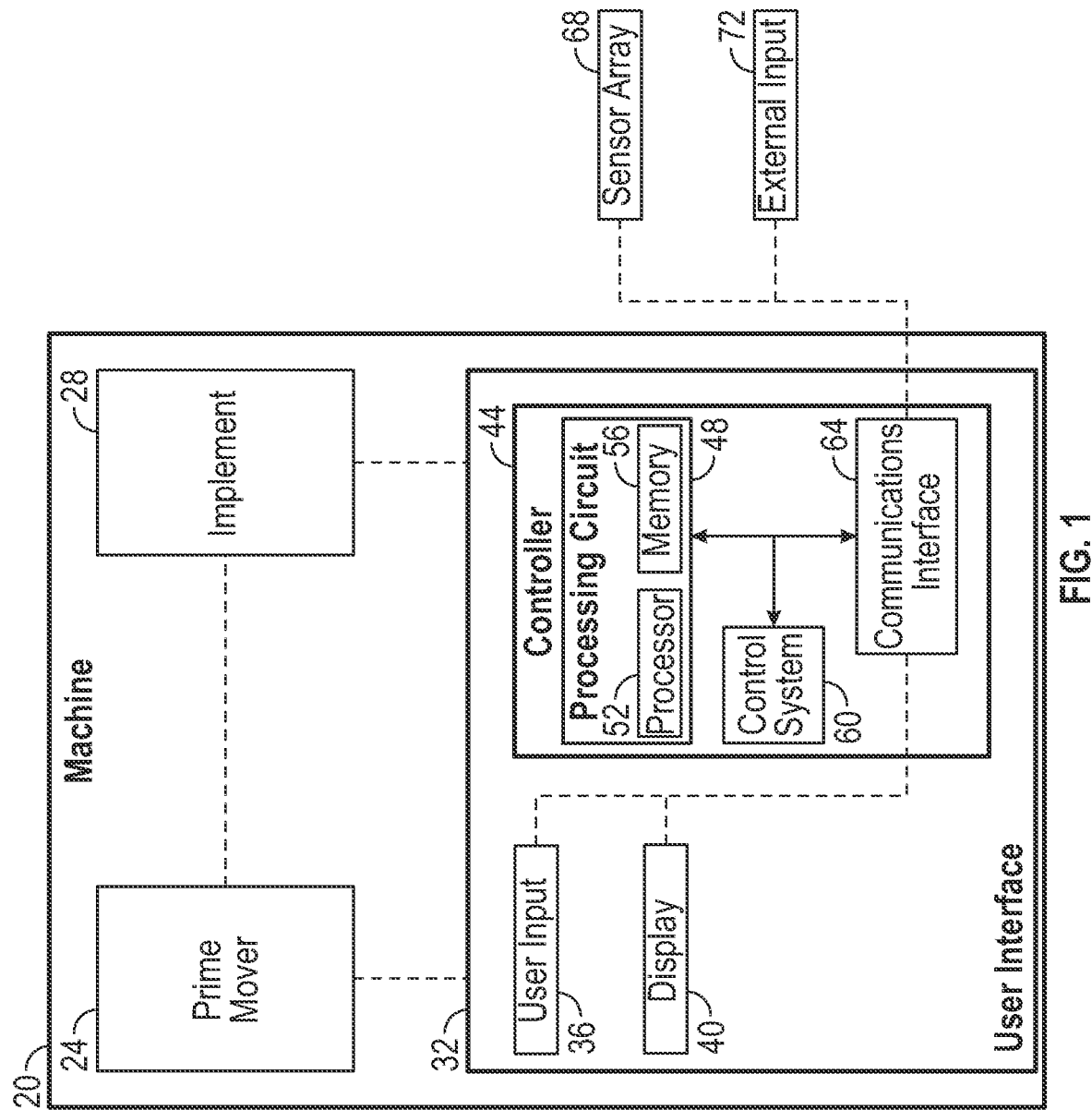
FIG. 1 is a schematic representation of a work machine including a work machine controller, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a work machine includes an onboard documentation system to receive, maintain, distribute, update, and provide documentation related to the work machine (i.e., technical documents, marketing materials, etc.) to users and operators. According to an exemplary embodiment, the onboard documentation system stores a comprehensive collection of documentation onboard the work machine itself (e.g., in local memory) such that it is readily accessible to a user no matter the connectivity status of the work machine. This saves time and improves efficiency by providing access to up-to-date documentation without delay or the need to access multiple, independent systems. Onboard documentation storage also allows for access to the necessary documents in remote locations that lack network access to a main server or hub and protects documentation from damage and wear due to worksite conditions. The onboard documentation system may also monitor the status of the work machine and provide documentation to a user based on the work machine's status. In some embodiments, the access to documents within the onboard documentation system is controlled according to one or more access codes, such that different documents are available to different users according to their level of access.

Referring to the figures generally, various exemplary embodiments disclosed herein relate to systems and methods for the onboard storage of documentation for work machines. According to an exemplary embodiment, an onboard documentation system, as part of a connected work machine control module or connectivity module may be used to store operation, parts, and service manuals, as well as marketing flyers and other documents directly on a work machine. The work machine may provide an integrated user interface for users to retrieve the onboard documentation via a local connection. According to an exemplary embodiment, the onboard documentation storage system is also configured to be accessible to a remote user via a wireless network connection.

In some embodiments, the wireless network connection is a local fleet connectivity system (e.g., as an interactivity and productivity tool for local fleet connectivity). The local fleet connectivity system may include a network of communicatively connected work machines such as lift devices. Network connections between work machines and other nodes connected to the system may include low energy wireless data networks, mesh networks, short-range wireless networks, satellite communications networks, cellular networks, or wireless data networks. In some implementations, the local fleet connectivity system is initiated by the automatic exchange of networking messages between different work machines in the plurality of communicatively connected work machines. In some embodiments, a network node is associated with each work machine in the plurality of networked work machines. In some embodiments, a first machine extends a connection to a second machine in proximity to the first machine on a worksite to establish a network link at the worksite. A local fleet connectivity system may include a worksite network established among a fleet of work machines at the worksite where machines connect with other nearby machines in a mesh network.

In some embodiments, network access is enabled according to one or more access codes (e.g., vehicle IDs, user IDs, passwords, etc.). In some embodiments, access to machine-specific data for one or more machines connected to the network, including digital documents and records stored locally on the machines, is provided and/or limited according to the one or more access codes. The access codes may be associated with a user or a work machine to facilitate communication. In some implementations, interconnectivity and productivity related data for the local fleet connectivity system is exchanged via connectivity modules. A connectivity module may be communicatively connected to a machine controller of the work machine. In some embodiments, the connectivity module is integrated into the machine controller, while in other embodiments the connectivity module may be a self-contained unit.

According to an exemplary embodiment, the onboard documentation system includes a controller configured to store documentation such as digital documents onboard the machine and receive and serve the digital documents to a user via a local or wireless connection. The controller may be a control module configured to control the operation of the work machine, a connectivity module configured to connect the work machine to a network, an independent onboard documentation module, or an integrated module performing as one or more of a control module, a connectivity module, or an onboard documentation module. In some embodiments, the controller may host one or more interconnectivity and productivity applications for the local fleet connectivity system. The one or more connectivity and productivity applications hosted by the plurality of machine controllers may be local instances of a remotely hosted master interconnectivity and productivity application.

According to an exemplary embodiment, the onboard documentation system for a work machine may operate within a local fleet connectivity system. As described above the local fleet connectivity system may include a mesh network for enhancing interactivity and productivity at a worksite. For example, the mesh network can be a Machine to Machine (M2M) network established by two or more work machines near each other. According to an exemplary embodiment, the onboard documentation system of the work machine includes technical literature for the machine such as technical manuals, flyers, etc. that can be delivered to a user via the mesh network of the local fleet connectivity system. For example, the onboard documentation system stores user and machine accessible data files containing service manuals, parts manuals, marketing flyers, etc. in local memory on the machine that are transmitted (e.g., via Bluetooth, via NFC, via a cellular network, etc.) for display on a remote device (e.g., a user's phone). In other embodiments, the documentation may also be displayed to an operator of the machine on an integrated display panel of the work machine via local connection. The onboard documentation system supports work machine document and literature digitization, receipt, indexing, storage, retrieval, document control, and other functions on work machines and other nodes connected via a network.

According to an exemplary embodiment, the local fleet connectivity system includes work machines, interface modules, worksite equipment, communications devices, communications networks, user interface devices, devices hosting self-forming network software, equipment users, equipment maintainers, and equipment suppliers. The information provided to the self-forming network, including onboard documentation independently stored on each work machine, may be communicated to a machine operator via a user interface. In some embodiments, onboard documentation stored on a machine is accessible to a remote user on another work machine via the local fleet connectivity system.

According to an exemplary embodiment, the local fleet connectivity system uses Bluetooth Low Energy (BLE) Machine to Machine (M2M) communication protocols to expand communication at a worksite. For example, physical coding sublayer internet protocol (PCS IP) coded instructions (e.g. applications) are used to provide interfaces between work machine software applications in various formats (e.g. MAC, PMA, etc.) and other devices (e.g. mobile user devices). PCS IP may be used, for example, in media-independent local fleet connectivity applications within the local fleet connectivity system. The local fleet connectivity system uses Bluetooth Low Energy (BLE) Machine to Machine (M2M) communication protocols at a worksite to generate and exchange machine driven notifications in a highly efficient and very low error rate information sharing mesh network. In traditional worksite information systems, these notifications are human-driven notifications requiring a human operator to manually generate a message and order the message to be transmitted. As such, traditional worksite information systems are inefficient and prone to human error. According to an exemplary embodiment, the work machines communicate across the wireless mesh network (e.g. a BLE M2M network) by sending messages via nodes hosted by the different work machines at the worksite. One machine extends a connection from one nearby work machine to a network of work machines, connecting the various machines across the worksite. According to an exemplary embodiment, machines and users may access the documentation stored locally in the work machines using the local fleet connectivity system and a code. The code may be a common code shared amongst the machines and one or more users (e.g. a "customer key", "owner key", "manufacturer key", etc.). According to an exemplary embodiment, the code is associated with a level of access to the local fleet connectivity system, including the onboard documentation of each of the individual machines. For example, when accessed using one type of access account such as a customer account (which is associated with a customer code or key), the user is provided access to all work machines operated by that customer and to onboard documentation desirable to a customer such as technical documents and rental agreements, whereas when the local fleet connectivity system and/or a work machine is accessed with an owner account the user is provided access to machine-specific data related to ownership from all of the connected machines owned by that user. For further example, access with a manufacturer code may provide access to all machines produced by that manufacturer, even across customers and worksites, and all documentation stored locally on such machines. According to an exemplary embodiment, the local fleet connectivity system may provide worksite network masking and visibility by means of these codes or other types of access keys to ensure system security and data confidentiality. According to an exemplary embodiment, the local fleet connectivity system may determine generation and routing of machine-generated push messages. These messages may be routed to specific machines based on system-determined or user input criteria.

According to the exemplary embodiment shown in FIG. 1, a work machine such as lift device (e.g., aerial work platform, telehandler, boom lift, scissor lift, etc.), shown as work machine 20, includes a prime mover (e.g., a spark ignition engine, a compression ignition engine, an electric motor, a generator set, a hybrid system, etc.), shown as prime mover 24. In other embodiments, the work machine 20 is another type of vehicle (i.e., fire apparatuses, military vehicles, boom trucks, refuse vehicles, fork lifts, etc.). According to an exemplary embodiment, the prime mover 24 is structured to supply power to the work machine 20 and an implement (e.g., aerial work platform, a lift boom, a scissor lift, a telehandler arm, etc.), shown as implement 28. By way of example, the implement 28 may be a boom including one or more boom sections and a platform assembly at the end of the boom.

As shown in FIG. 1, the work machine 20 includes a user interface, shown as user interface 32, in communication with the prime mover 24 and the implement 28. The user interface 32 is configured to control the prime mover 24 and the implement 28 and therefore control the operations of the work machine 20. According to an exemplary embodiment, the user interface 32 includes a user input, shown as user input 36, that allows a machine operator to interact with the user interface 32, and a display, shown as display 40, for communicating to the machine operator, and a controller 44. In some embodiments, the work machine is a remote operated work machine and the user interface 32, including user input 36 and display 40, is located on a remote device connected to the work machine. For example, the remote device can connect to the work machine via a local wireless network established by the work machine. In another embodiment, the user interface connects to the work machine via a connectivity module. According to an exemplary embodiment, the user input 36 and display 40 are located within implement 28. For example, implement 28 may be a boom including a platform assembly for lifting workers to a desired height, and the platform assembly may contain the user input 36 and display 40 to allow an operator of the implement 28 to control the work machine 20 while onboard the platform assembly.

As shown in FIG. 1, the user interface 32 further includes a controller, shown as controller 44 configured to established and maintain the onboard documentation system. In one embodiment, the controller 44 is configured to receive, store, update, and provide documentation (e.g., technical documents, ownership records, marketing materials, etc.) associated with the work machine 20 to one or more users. In some embodiments, the controller 44 is configured to facilitate receiving, storing, and updating the documentation via a local fleet connectivity system established by one or more other work machines on a worksite. In other embodiments, the controller 44 is configured to connect to a remote wireless network such as a cellular network.

As shown in FIG. 1, the controller 44 is connected to the prime mover 24, the implement 28, one or more sensors, shown as sensor array 68, and an external input, shown as external input 72. In other embodiments, the controller 44 is connected to more or fewer components. The controller 44 may be configured to control the operation of the work machine 20 in addition to operating the onboard documentation system. By way of example, the controller 44 may detect a fault in the implement 28 of the work machine 20 using the sensor array 68 and may associate that fault with a portion of the documentation stored locally by the controller 44 on the work machine 20. The controller 44 may then automatically provide the portion of the documentation associated with the fault to a user, operator, owner, etc. The controller 44 may also connect to and interact with other work machines and/or controllers. By way of example, the controller 44 may help establish and maintain a local fleet connectivity system formed as a mesh network by a plurality of connected work machines.

The controller 44 may be implemented as a general-purpose processor, an application specific integrated circuit (ASIC), one or more field programmable gate arrays (FPGAs), a digital-signal-processor (DSP), circuits containing one or more processing components, or other suitable electronic processing components. For example, the controller 44 may be structured as one or more electronic control units (ECU) embodied within the work machine 20. In other embodiments, the controller 44 may be separate from or included with at least one of an implement control unit, an exhaust after-treatment control unit, a powertrain control module, an engine control module, a vehicle control module, a connectivity module, etc.

According to the exemplary embodiment shown in FIG. 1, the controller 44 includes a control system 60. The control system 60 may be embodied as non-transient machine or computer-readable media that is executable by a processor, such as processor 52. As described herein, and amongst other uses, the machine-readable media facilitates the performance of certain operations to enable reception, storage, and transmission of data. For example, the machine-readable media may provide an instruction (e.g., command, etc.) to acquire data such as service, operator, and parts manuals associated with the work machine 20. In this regard, the machine-readable media may include programmable logic that defines the frequency of acquisition of the data (or, transmission of the data). According to an exemplary embodiment, the computer readable media includes code, which may be written in any programming language including, but not limited to, Java or the like and any conventional procedural programming languages, such as the "C" programming language or similar programming languages. In some embodiments, the computer readable program code may be executed on one processor or multiple remote processors. In the latter scenario, the remote processors may be connected to each other through any type of network (e.g., CAN bus, etc.).

According to another exemplary embodiment, the control system 60 is embodied as one or more hardware units such as those described above with reference to the controller 44 itself. The control system 60 may be embodied as one or more circuitry components including, but not limited to, processing circuitry, network interfaces, peripheral devices, input devices, output devices, sensors, etc. In some embodiments, the control system 60 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the control system 60 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The control system 60 may also include programmable hardware devices such as FPGAs, programmable array logic, programmable logic devices or the like. According to an exemplary embodiment, the control system 60 may include one or more memory devices for storing instructions that are executable by one or more of the processor(s) of the control system 60 and/or processor 52. The one or more memory devices and processor(s) may have the same definition as provided below with respect to the memory device 56 and processor 52. In some hardware unit configurations, the control system 60 may be physically dispersed throughout separate locations in the machine. Alternatively, and as shown, the control system 60 may be embodied in or within a single unit/housing, which is shown as the controller 44.

As shown in FIG. 1, the controller 44 includes the processing circuit 48 having the processor 52 and the memory device 56. The processing circuit 48 may be structured or configured to execute or implement the instructions, commands, and/or control processes described above with respect to control system 60. The depicted configuration represents the control system 60 as machine or computer-readable media. However, as mentioned above, this illustration is not meant to be limiting as the present disclosure contemplates other embodiments where the control system 60, or at least one circuit of the control system 60, is configured as a hardware unit and/or is embodied within the processing circuit 48. All such combinations and variations are intended to fall within the scope of the present disclosure.

According to an exemplary embodiment, hardware and data processing components that make up the processing circuit 48 and which are used to implement the various processes, operations, illustrative logics, logical blocks, modules and circuits described in connection with the embodiments disclosed herein (e.g., the processor 52) may be implemented or performed with a general purpose single- or multi-chip processor, a DSP, an ASIC, an FPGA, or other programmable logic device, discrete gate or transistor logic, discrete hardware components, or any combination thereof designed to perform the functions described herein. A general purpose processor may be a microprocessor, or, any conventional processor, or state machine. According to an exemplary embodiment, the processor 52 may also be implemented as a combination of computing devices, such as a combination of a DSP and a microprocessor, a plurality of microprocessors, one or more microprocessors in conjunction with a DSP core, or any other such configuration. In some embodiments, the one or more processors that make up the processor 52 may be shared by multiple circuits (e.g., control system 60 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other embodiments, two or more processors may be coupled via a bus to enable independent, parallel, pipelined, or multi-threaded instruction execution. All such variations are intended to fall within the scope of the present disclosure.

The memory device 56 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory 56 may be any tangible, non-transient, volatile or non-volatile computer-readable storage medium capable of storing data or computer code relating to the activities described herein. For example, the memory device 56 may include database components, object code components, script components, or any other type of information structure for supporting the various activities and information structures described herein. According to the exemplary embodiment shown in FIG. 1, the memory device 56 is communicably connected to the processor 52 via the processing circuit 48 to provide the computer code or instructions to the processor 52 for executing at least some of the processes described herein.

According to an exemplary embodiment, the memory device 56 stores data for an onboard documentation system. The onboard documentation system may input, store, update, retrieve, transmit, and display digital documents and records related to the manufacture, purchase, operation, maintenance, and compliance of a particular work machine. According to an exemplary embodiment, the digital documents are stored locally in the memory device 56 of the work machine 20. In some embodiments, the digital documents are digitized versions of physical documents, such as proof of ownership records or maintenance records. The digital documents may include operator's manuals, service manuals, parts manuals, technical materials, marketing materials, proof of ownership records, maintenance records, compliance records, access logs, operations logs, network permission, rental history, accident history, ownership history, location history, and/or other documents related to the work machine.

As shown in FIG. 1, the work machine 20 includes an integrated display (e.g., a display screen, a lamp or light, an audio device, a dial, or another display or output device), shown as display 40. The display 40 may be configured to display a graphical user interface, an image, an icon, and/or other information. According to an exemplary embodiment, the display includes a graphical user interface configured to provide access to and management of documentation stored onboard the work machine 20. The graphical user interface may also be configured to display current status information and other details of a local fleet connectivity system. In some embodiments, the documentation may also be transmitted (e.g., via Bluetooth, via a cellular network, via a local fleet connectivity system, etc.) for display on a remote device (e.g., a user's phone).

As shown in FIG. 1, the documentation may accessed and manipulated at the work machine 20 by a user via user input 36. The user input 36 may include one or more buttons, knobs, touchscreens, switches, levers, joysticks, pedals, steering wheels, handles, etc. The user input 36 may facilitate manual control over some or all aspects of the operation of the work machine 20. It should be understood that any type of display or input controls may be implemented with the systems and methods described herein.

As shown in FIG. 1, the controller 44 includes a communications interface 64 configured to receive inputs and generate outputs for or from the sensor array 68 and the external inputs or outputs 72 (e.g. a load map, a machine-to-machine communication module, a fleet management system, a user interface, a network, etc.).

According to an exemplary embodiment, the control system 60 generates a range of inputs, outputs, and user interfaces. The inputs, outputs, and user interfaces may be related to a jobsite, a status of a piece of equipment, environmental conditions, equipment telematics, an equipment location, task instructions, sensor data, equipment consumables data (e.g. a fuel level, a condition of a battery), status, location, or sensor data from another connected piece of equipment, communications link availability and status, hazard information, positions of objects relative to a piece of equipment, device configuration data, part tracking data, text and graphic messages, weather alerts, equipment operation, maintenance, and service data, equipment beacon commands, tracking data, performance data, cost data, operating and idle time data, remote operation commands, reprogramming and reconfiguration data and commands, self-test commands and data, software as a service data and commands, advertising information, access control commands and data, onboard documentation, machine software revision data, fleet management commands and data, logistics data, equipment inspection data including inspection of another piece of equipment using onboard sensors, prioritization of communication link use, predictive maintenance data, tagged consumable data, remote fault detection data, machine synchronization commands and data including cooperative operation of machines, equipment data bus information, operator notification data, work machine twinning displays, commands, and data, etc.

According to an exemplary embodiment, the sensor array 68 can include physical and virtual sensors for determining work machine states, work machine conditions, work machine locations, loads, and location devices. In some embodiments, the sensor array includes a GPS device, a LIDAR location device, inertial navigation, or other sensors structured to determine a position of the work machine 20 relative to locations, maps, other equipment, objects or other reference points.

Figure 2:
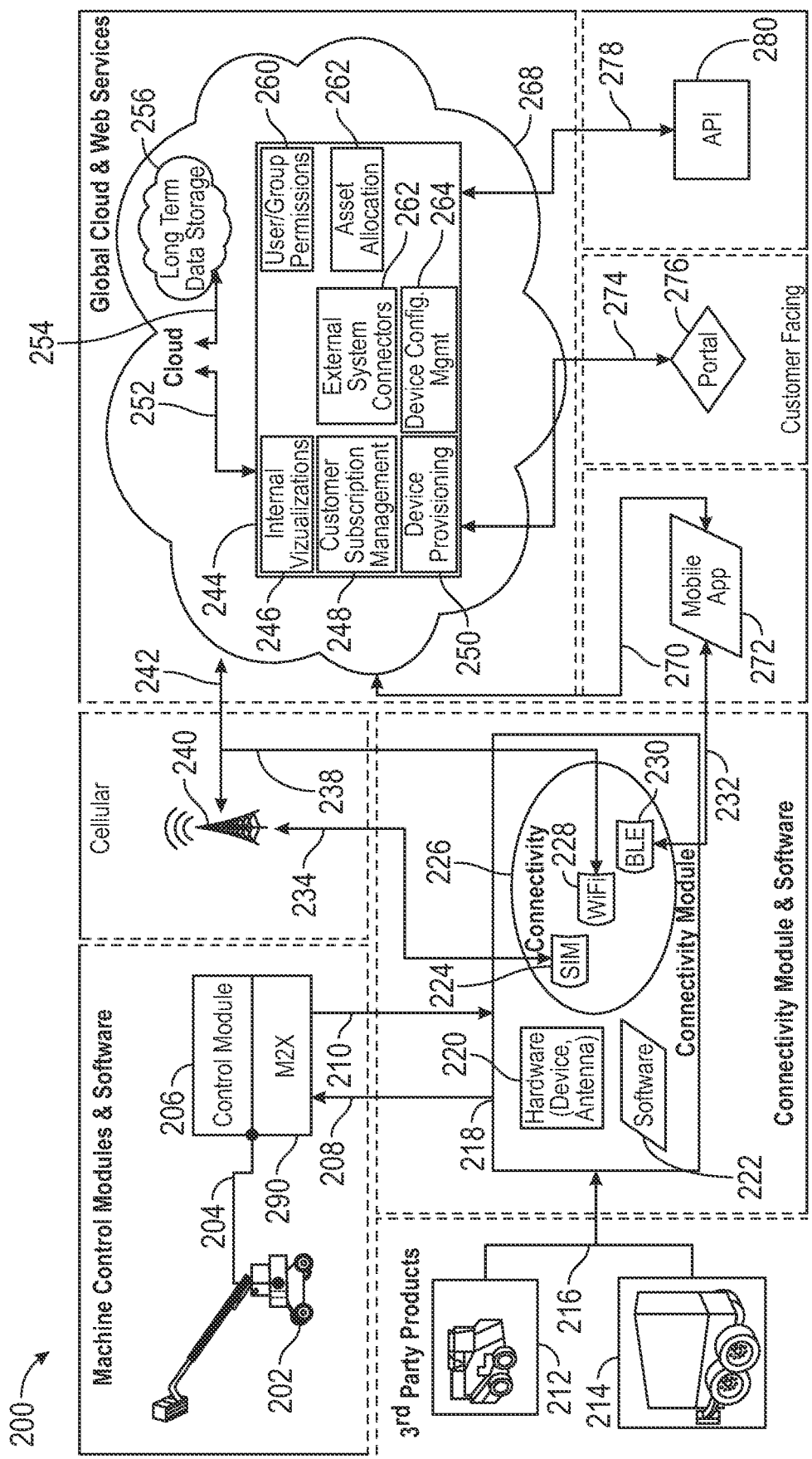
FIG. 2 is a schematic representation of a local fleet connectivity system, according to an exemplary embodiment.

As shown in FIG. 2, the onboard documentation system is supported by a local fleet connectivity system 200. The local fleet connectivity system 200 may include one or more work machines 202, each with a control module 206, one or more connectivity modules 218, and/or one or more network devices hosting, for example, user interfaces 272, network portals 276, application interfaces/application programming interfaces 280, data storage systems 256, cloud and web services, and product development tool and application hubs 244. The local fleet connectivity system may enable communication between connected work machines and allow for commands and data to be exchanged according to one or more commands or machine states.

As shown in FIG. 2, the work machine 202 is communicably connected via connection 204 to a control module 206. According to an exemplary embodiment, the control module 206 includes the user interface 32 discussed above with reference to FIG. 1. The connection 204 between the work machine 202 and the control module 206 may be wired or wireless thus providing the flexibility to integrate the control module with the work machine 202 or to temporarily attach the control module 206 to the work machine 202. The control module 206 may be configured or may be reconfigurable in both hardware and software to interface with a variety of work machines, such as work machine 202 and third party products 212, 214. According to an exemplary embodiment, the control module 206 is configured to interface with a single work machine such as work machine 202 with one or more other work machines such as third party products 212 and 214 via the connectivity module 218. The control module 206 may comprise an integral power source or may draw power from the work machine 202 or another external source of power. Control modules 206 may be installed on or connected to products (e.g. third party products 212, 214) not configured by the original product manufacturer with a control module 206.

The work machine 202 communicably connects to the local fleet connectivity system 200 via a machine-to-X (M2X) module 290. The M2X module 290 is communicably connected to the control module 206. In some embodiments, the M2X module 290 is an independent module. In other embodiments, the M2X module 290 and the control module 206 are embodied in the same module. According to an the exemplary embodiment shown in FIG. 2, the M2X module 290 establishes one or more communications channels 208, 210 with a connectivity module 218. The connectivity module 218 provides a plurality of links between one or more work machines 202, third party products 212, 214, and as part of the local fleet connectivity system 200. In some embodiments, local fleet connectivity system applications run by the M2X modules 290 on one or more work machines 202 exchange commands, codes (e.g. a customer key) and data between work machines 202, third party products 212, 214, and user devices including user interfaces 272, forming a network of interconnections among machines, devices, or nodes. In some embodiments, the self-forming network between work machines and user devices is a wireless mesh network.

As shown in FIG. 2, the connectivity module 218 includes hardware 220, itself including antennas, switching circuits, filters, amplifiers, mixers, and other signal processing devices for a plurality of wavelengths, frequencies, etc., as well as software hosted on a non-volatile memory components 222, and a communications manager 226. The communications manager 226 may comprise processing circuits with communications one or more network protocol front ends, shown as front ends SIM 224, WiFi 228, and BLE 230. In some embodiments, the communications manager 226 contains one or more other front ends for example, Bluetooth, NFC, optical, and satellite communications. In some embodiments, the connectivity module 218 functions as a gateway device connecting work machine 202 to other work machines (e.g., third party products 212, 214), application hubs 244, user interfaces 272, portals 276, APIs 280, beacons, scheduling or other fleet management and coordination systems.

According to an exemplary embodiment, the local fleet connectivity system 200 allows for the coordination of multiple work machines 202 and third party products 212, 214 within the same worksite and/or a fleet-wide control across multiple worksites. For example, work machine 202 and third party products 212, 214 may coordinate to perform self-inspections at the same time and remotely report the results of a self-inspection to a user via a user device including user interface 272.

According to the exemplary embodiment shown in FIG. 2, the local fleet connectivity system 200 provides connectivity between work machine 202, third party products 212, 214 and remotely hosted user interface 272, network portal 276, application interfaces/application programming interface 280, data storage system 256, cloud and web service 268, and product development tool and application hub 244 that function as an Internet of Things (IoT) system for operation, control, and support of work machine 202 and third party products 212, 214. Connections 232, 234, 238, 242, 252, 254, 270, 274, and 278 between nodes connected to the local fleet connectivity system 200 may comprise, for example, cellular networks (e.g., via cell towers 240), or other existing or new means of digital connectivity.

As shown in FIG. 2, product development tool and application hubs 244 may comprise tools and applications for internal visualizations 246, customer subscription management 248, device provisioning 250, external systems connectors 262, device configuration management 264, user/group permissions 260, asset allocation 258, fleet management, compliance, etc. In some embodiments, product development tool and application hubs 244 communicates with the onboard documentation system hosted by control module 206 on work machine 202 and provides new and/or updated documentation to be stored locally on the work machine 202. For example, work machine 202 may spend a period of time disconnected from the product development tool and application hubs 244, and in that time the manufacturer of work machine 202 may have updated the operators manual for machines such as work machine 202. When work machine 202 reconnects to the product development tool and application hubs 244 the onboard documentation system may request and/or receive the updated copy of the operators manual and store the updated copy locally on work machine 202.

Figure 3:
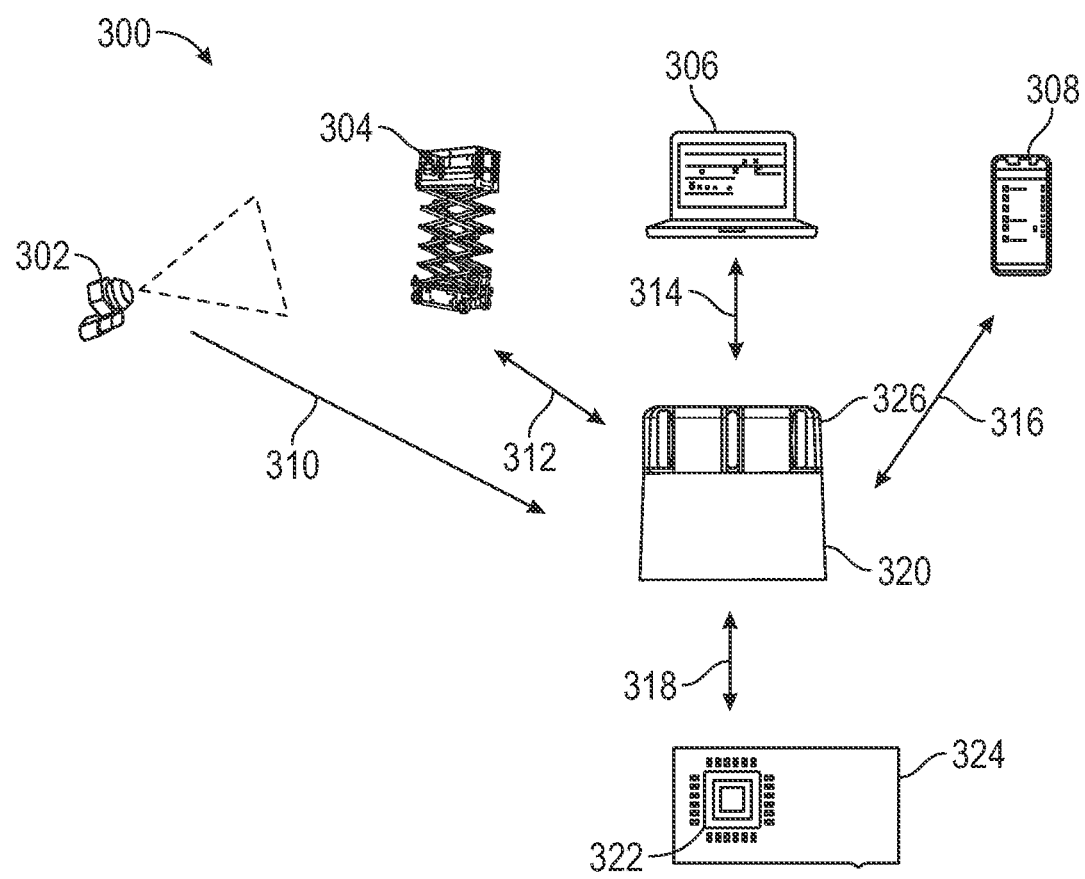
FIG. 3 is a schematic representation of the local fleet connectivity system of FIG. 2 with an M2X module to facilitate connectivity, according to an exemplary embodiment.

As shown in FIG. 3, a local fleet connectivity system 300 can be used to support the onboard documentation system operated by the control system 322 of the work machine 324. As shown in FIG. 3, the M2X module 320 facilitates communication between the control system 322 of the work machine 324 and other elements connected to the local fleet connectivity system 200. The M2X module 320 may be part of the work machine 324 or may a separate part physically coupled to the work machine 324. The M2X module 320 may exchange commands and data 318 with the control system 322; sensor data 310 with auxiliary sensors 302; machine data 312 with another machine 304; commands and data 314 with a node or portal 306; and commands, data, and information from the onboard documentation system 316 with a user device 308 running an application for the equipment self-forming network system. For example, a user device 308 may request to view the documentation stored on work machine 324. The control system 322 operating the onboard documentation system may retrieve the requested document(s) and provide them to the user device 308. In some embodiments, the portal 306 and/or user device 308 may also manage the documentation stored locally on the work machine 324. For example, an owner of the work machine 324 accessing the work machine 324 via the portal 306 may remove records of a rental agreement after that agreement has been completed. Users may modify, update, and remove any documents stored by the onboard documentation system either directly or through a remote connection.

According to an exemplary embodiment, the local fleet connectivity system 300 allows for the coordination of multiple machines 304, 324 within the same worksite, or a fleet wide control. For example, if a first work machine 304 is required to accomplish a task collaboratively with a second work machine 324, a user interacting with a user device 308 may provide commands to the first work machine 304 and second work machine 324 to execute the task in collaboration.

Figure 4:
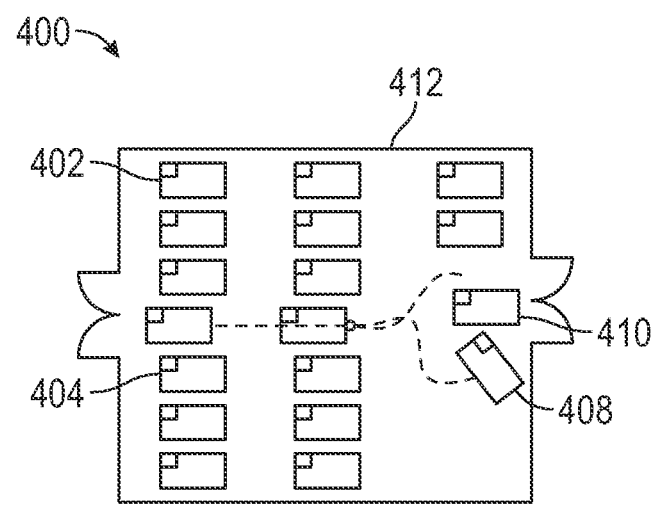
FIG. 4 is a schematic representation of a worksite and work machine staging area with the local fleet connectivity system of FIG. 2, according to an exemplary embodiment.

As shown in FIG. 4, the local fleet connectivity system 400 may be deployed at a worksite 412 to control a fleet of work machines 402, 404, 408, and 410 to collaboratively perform tasks requiring more than one work machine 408, 410. For example, a user may wish to move the work machine 410 from its stored position on the left of the worksite 412 out the door on the right of the worksite. The work machines 408 and 410 may communicate with each other and coordinate their movement, causing the work machine 408 to move out of the way of the work machine 410, so that the work machine 410 can move past the work machine 408 and out the doorway.

Figure 5:
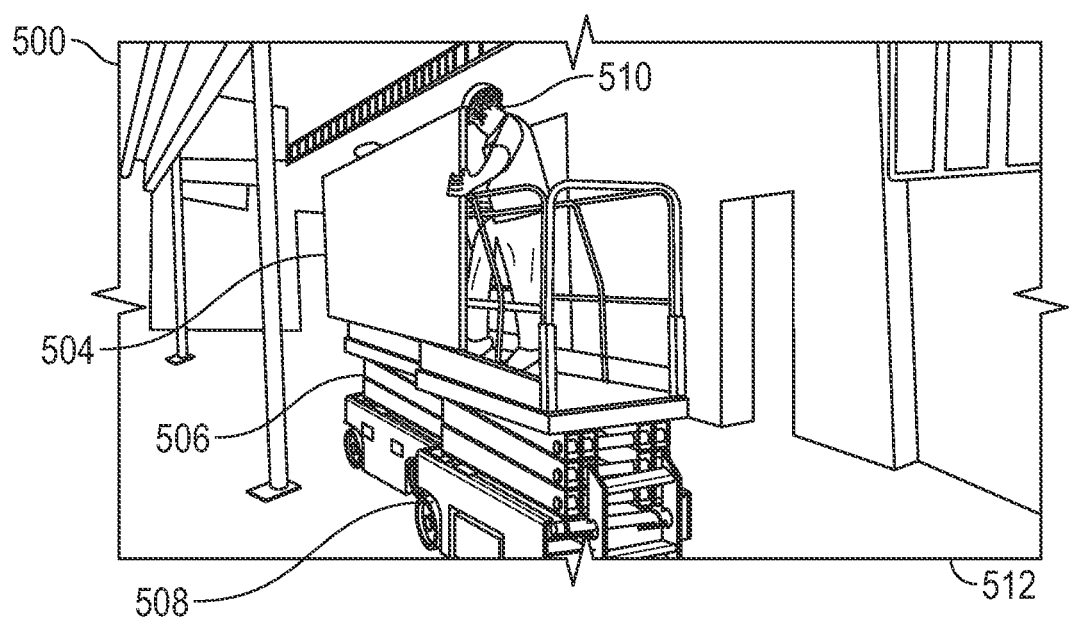
FIG. 5 is an illustration of a two lift devices at a worksite connected by the local fleet connectivity system of FIG. 2, according to an exemplary embodiment.

As shown in FIG. 5, a plurality of work machines 506, 508 connected to the local fleet connectivity system 500 via integrated connectivity modules may collaboratively perform tasks on a jobsite 512 requiring more than one work machine. For example, communicating via the local fleet connectivity system 500 the work machines 506, 508 may help place a section of drywall 504 that is too large for a single work machine. Via the local fleet connectivity system 500 the work machine 506 and the work machine 508 and can coordinate movement so that a users 510 on each work machine 506, 508 can hold the drywall 504 while the work machines 506, 508 are moving. Connectivity with the local fleet connectivity system 500 prevents the machines 506, 508 from being separated so that the users 510 do not drop the drywall 504.

Figure 6:
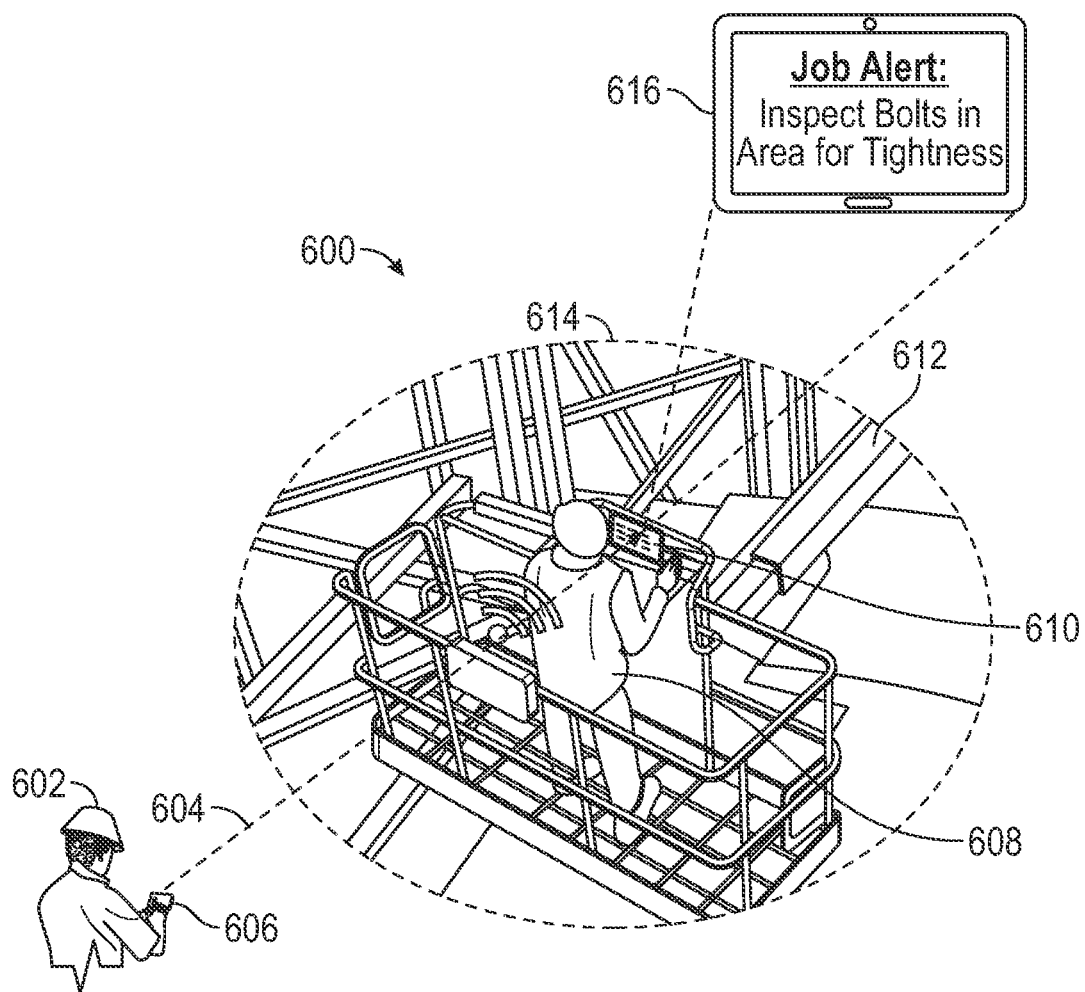
FIG. 6 is an illustration of a lift device providing connectivity to a remote user via the local fleet connectivity system of FIG. 2, according to an exemplary embodiment.

As shown in FIG. 6, a remote user 602 of a local fleet connectivity system 600 can send messages and data 604 from a remote device 606 to an onsite user 608 on a jobsite 614. The messages and data 604 may be received by the control system 610 of a work machine 612 and displayed via a user interface on an onboard display 616. The remote user 608 may send work instructions to the onsite user 608, informing the onsite user 608 of talks to be performed using the work machine 612. For example, as shown in FIG. 6, the remote user 602 may send instructions to the onsite user 608 to use the work machine 612 to inspect bolt tightness in the area. The instructions may displayed for the onsite user 608 on the onboard display 616. This allows the onsite user 608 to receive and view the instructions without the need to call the remote user 602 or write the instructions down. Because the work machine 612 is connected to the remote device 606 (e.g., via a connectivity module 218) the remote user 602 may receive the location of the work machine 612, as well as other work machines on the jobsite 614, and may use the location information to determine the instructions to send. In some embodiments, the onsite user 608 can access documentation stored onboard the work machine 612 while operating the work machine 612. For example, while lifted in the air, the onsite user 608 can access an operator's manual stored locally on the work machine 612 to review the controls or other operational aspects of work machine 612 when needed. A confused operator would be able to reference the documentation directly via the onboard display 616. In some embodiments, the remote user 602 may also access the documentation stored on the work machine 612, for example in order to help an onsite operator 612 perform an operation. According to an exemplary embodiment, the control system 610 of work machine 612 may monitor the status of the work machine 612 and provide relevant documentation proactively to the onsite user 608 when it detects one or more machine states associated with one or more document(s) of the documentation.

Figure 7:
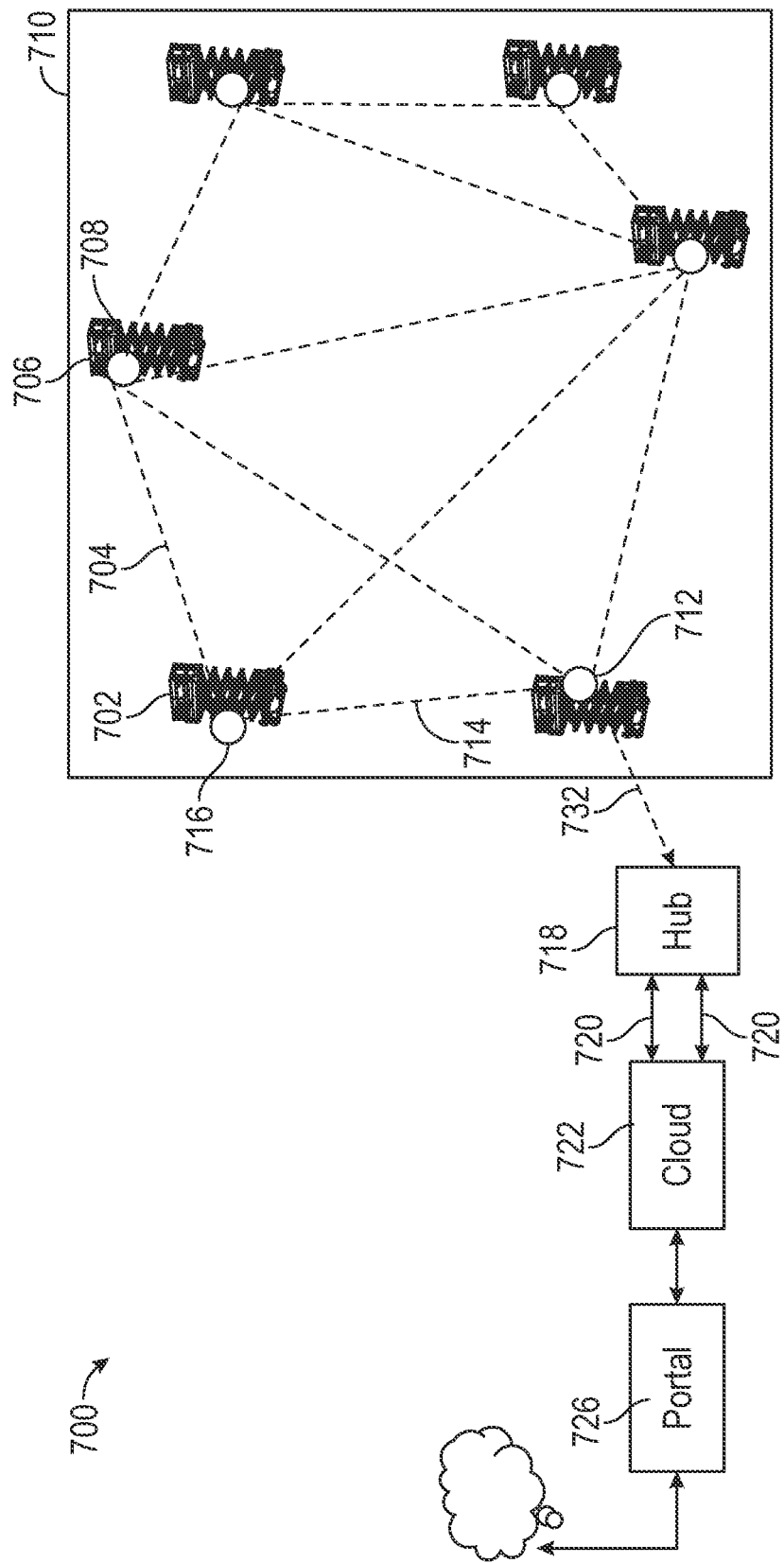
FIG. 7 is a schematic representation of a worksite with the local fleet connectivity system of FIG. 2 providing connectivity to off-site systems, according to an exemplary embodiment.

As shown in FIG. 7, a local fleet connectivity network system 700 includes a connectivity hub 718 configured to act as a central connection point for one or more work machines with their own connectivity modules. In some embodiments, the connectivity hub includes a connectivity module. In some embodiments, the connectivity hub is configured to communicatively connect with one or more connectivity module-equipped machines 702, 706 in proximity to the connectivity hub 718. In some embodiments, the connectivity hub is configured to broadcast a worksite identification signal. In some embodiments, the connectivity hub is configured to connect worksite machines 702, 706 on a local fleet network to an external internet feed 720. In some configurations, the connectivity hub is configured as a gateway to one or more communications systems or network systems to enable exchanges of data 720, 722 between nodes 708, 712, 716 on the worksite 710 local fleet connectivity mesh network 704, 714, 732 and nodes 726 external to the worksite.

In some embodiments, connectivity hub has a connectively module to (a) provides the functionalities described here in place of or in addition to a machine that has a connectivity module, (b) broadcasts a site identifier, or (c) connects to an external internet to flow through data to and from the jobsite that is provided across the mesh.

Figure 8:
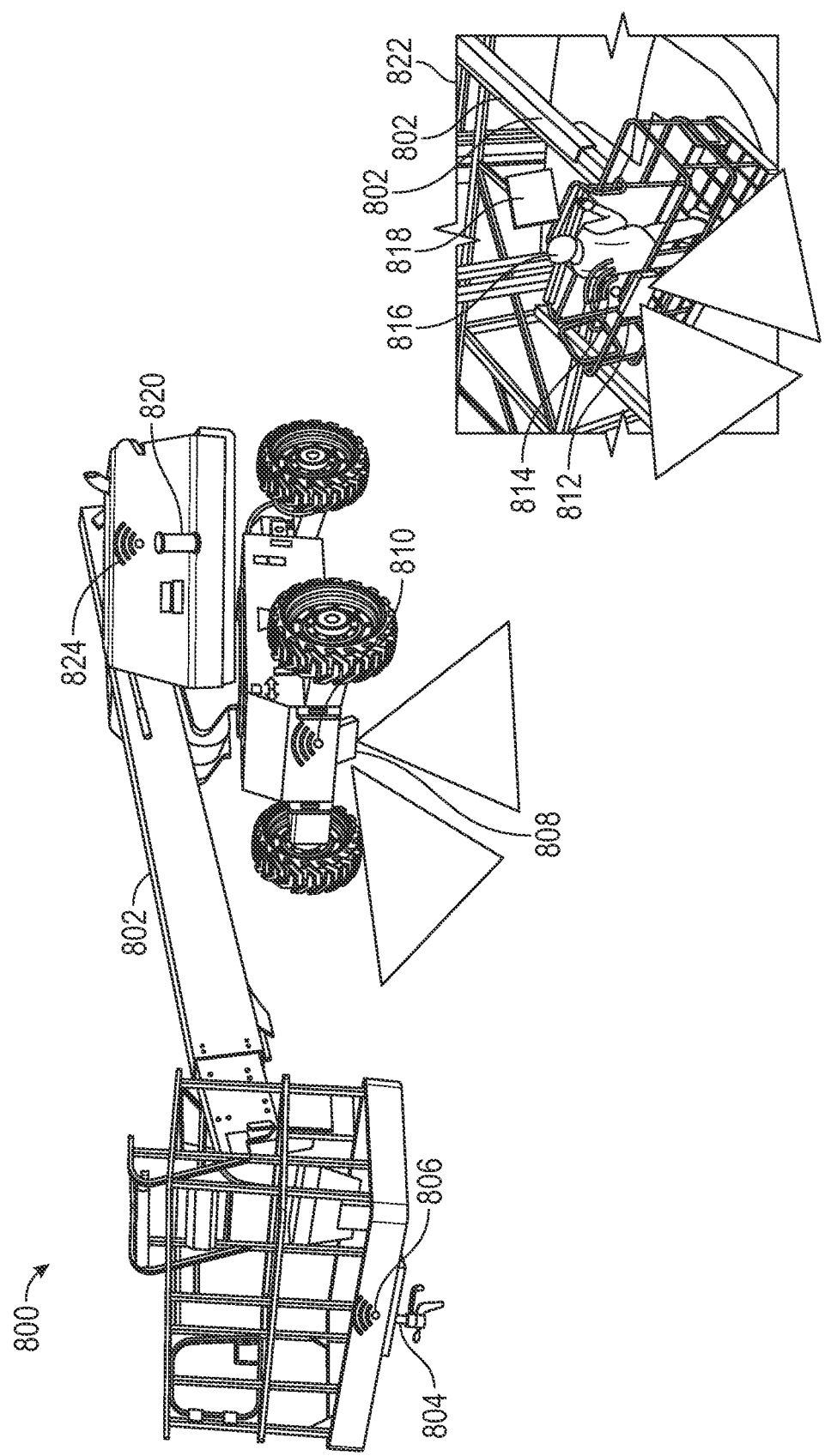
FIG. 8 is an illustration of a lift device configured with the local fleet connectivity system of FIG. 2, according to an exemplary embodiment.

As shown in FIG. 8, work machines 802 of a local fleet connectivity system 800 may include one or sensors. As shown in FIG. 8, sensors 804, 808, 812, 820 may be coupled to a work machine 802 on a jobsite 822. The sensors may be, for example, object detection sensors 808 812, environmental sensors 804 (e.g., wind speed, temperature sensors), and tagged consumable sensors 820. In some embodiments, one or more other sensors may also be included to measure the machine state of work machines 802, 820. The sensors 804, 808, 812, 820 may be connected to and may send data to via the local fleet connectivity system 800 via wireless connections 806, 810, 814, 824. The sensor data may displayed or may be used to generate messages for display on an onboard display 818 for a user 816 of the work machine 802. In some embodiments, the sensor data may be used to determine a machine state or status of the work machine 802. The status may be used by an onboard documentation system to provide documentation associated with the status automatically.

Figure 9:
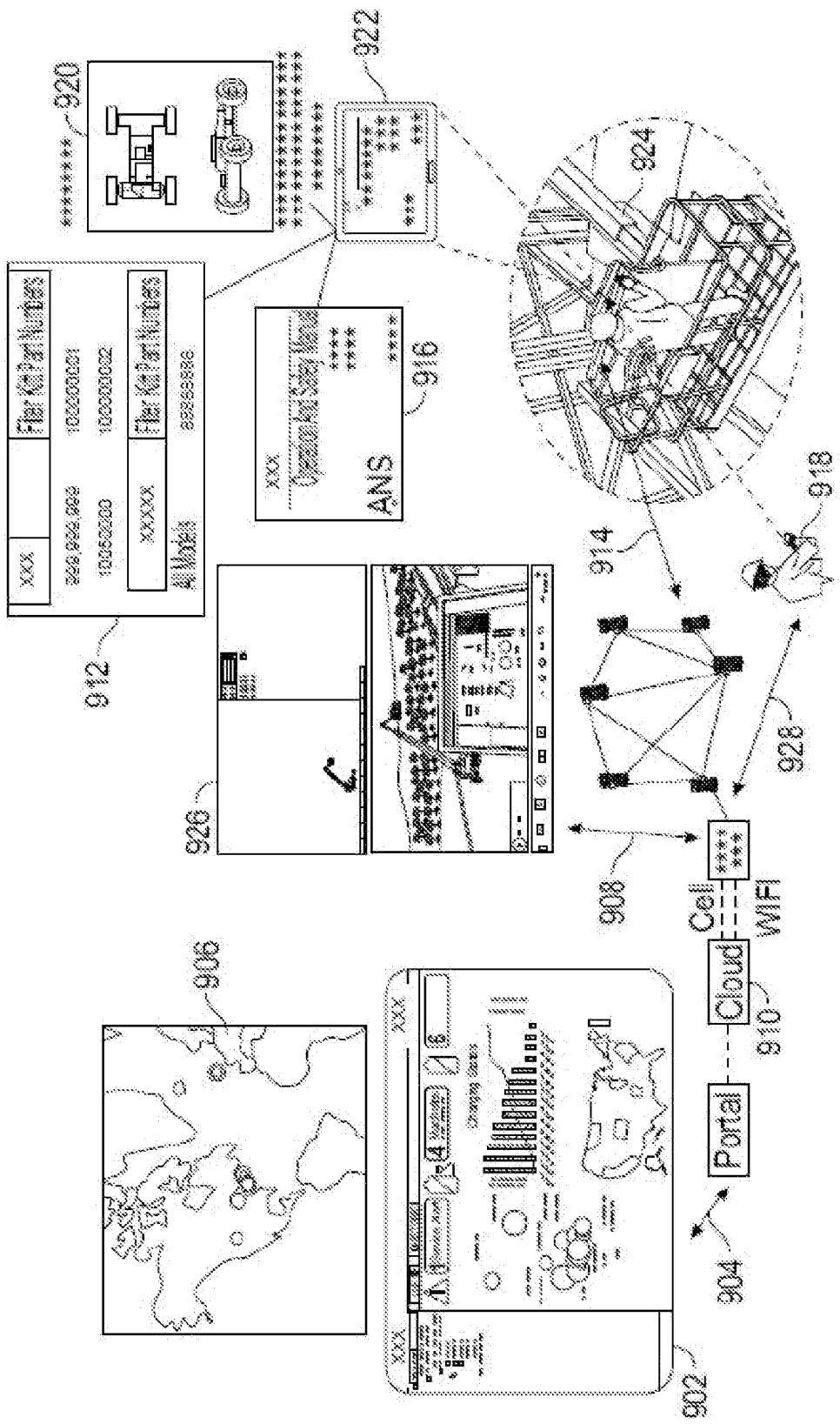
FIG. 9 is a graphical user interface of the local fleet connectivity system of FIG. 2, according to an exemplary embodiment.

As shown in FIG. 9, an onboard documentation system enables users to retrieve this documentation (operator, parts, service manuals, marketing flyers, etc.) via a local connection (e.g., on integrated display 922) or remote connection (e.g., via a user device 918). As shown in FIG. 9, the documentation may include operations and safety manuals 916 specific to the work machine 924, maintenance, spares, and repair information 912, illustrated parts breakdowns 920, and/or other information 902, 906, 926, stored on the work machine 924 and accessible and modifiable by users or other nodes via the local fleet connectivity system. User and node permissions (e.g., access codes, keys, etc.) may be applied to control onboard document access and may be implemented as an element of an onboard document security, data protection, and document control application.

Figure 10:
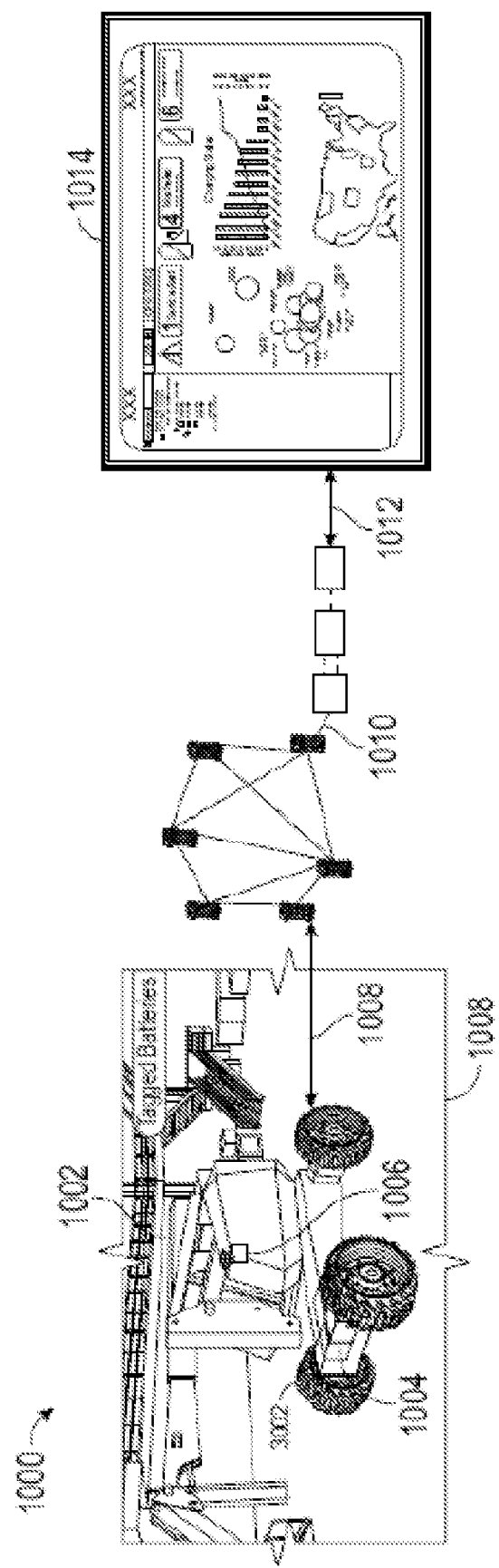
FIG. 10 is an illustration of a work machine with machine specific output data connected to the local fleet connectivity system of FIG. 2, according to an exemplary embodiment.

As shown in FIG. 10, an onboard documentation system 1000 is shown to include information on tagged consumables. A work machine 1002 on a worksite 1008 includes tagged consumables 1004 (e.g., batteries connected to battery charger 1006). The machine 1002 sends and receives data 1016 to and from the connectivity hub 1010. The connectivity hub 1010 sends and receives data 1012 to and from a user interface 1014. Data regarding the tagged consumables 1004 may be stored locally on the work machine 1002 or communicated to the user interface 1014 via the connectivity hub 1010. For example, source information, maintenance records, battery charge state and battery health may be stored locally and sent to the user interface 1014.

Figure 11:
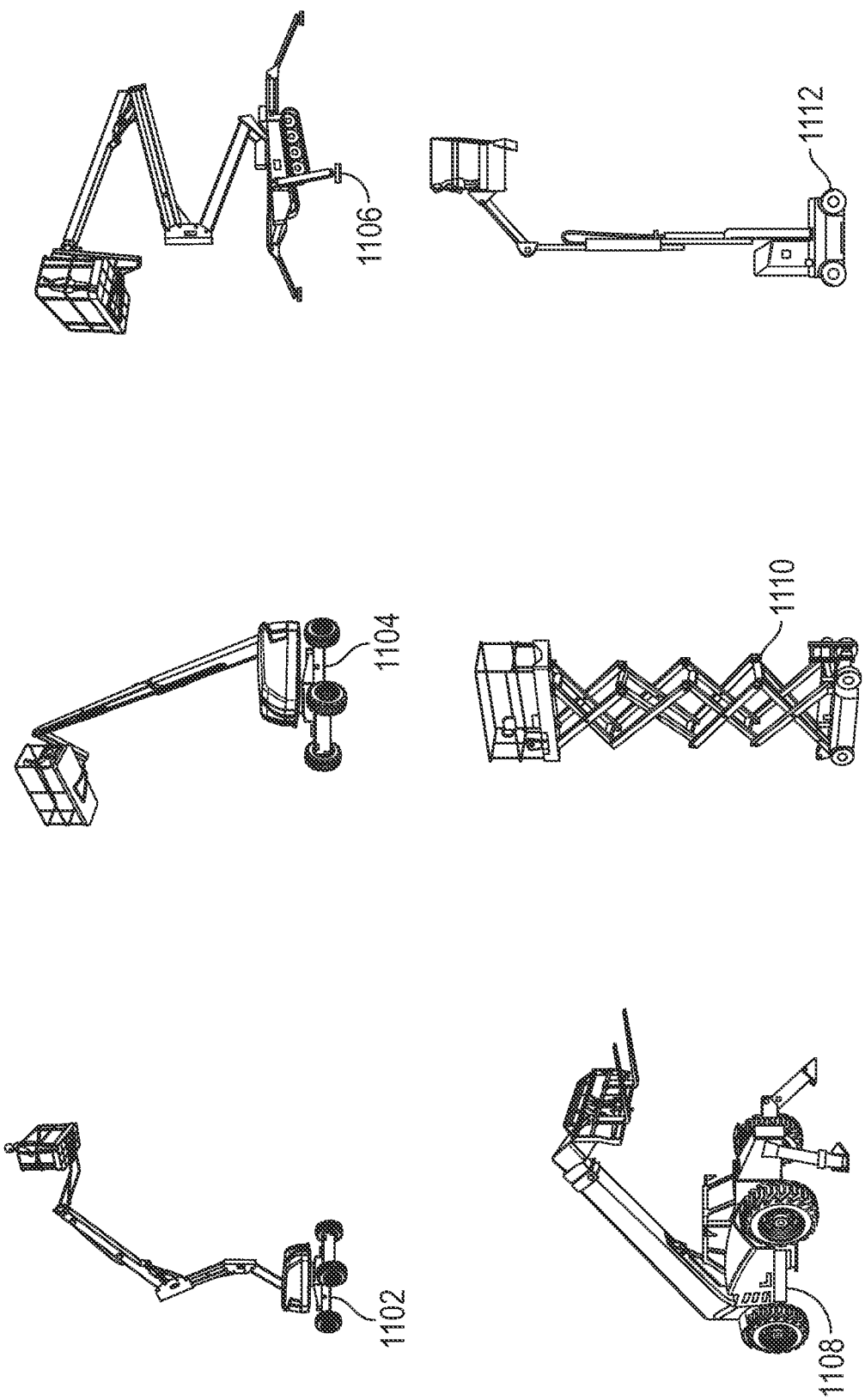
FIG. 11 is illustrations of work machines configured for use in the local fleet connectivity system of FIG. 2, according to an exemplary embodiment.

As shown in FIG. 11, the equipment onboard documentation system and methods described above may be implemented using various work machines 20 such as an articulating boom lift 1102 as shown in FIG. 11, a telescoping boom lift 1104 as shown in FIG. 11, a compact crawler boom lift 1106 as shown in FIG. 11, a telehandler 1108 as shown in FIG. 11, a scissor lift 1110, and/or a toucan mast boom lift 1112.

According to the exemplary embodiment shown in FIG. 11, the work machine 20 (e.g., a lift devices, articulating boom lift 1102, telescoping boom lift 1104, compact crawler boom lift 1106, telehandler 1108, toucan mast boom lift 1112) may include a chassis (e.g., a lift base), which supports a rotatable structure (e.g., a turntable, etc.) and a lifting device such as a boom assembly (e.g., boom). In other embodiments, the lifting device may be a scissor lift assembly, such as shown in scissor lift 1110. According to an exemplary embodiment, the turntable is rotatable relative to the lift base. According to an exemplary embodiment, the turntable includes a counterweight positioned at a rear of the turntable. In other embodiments, the counterweight is otherwise positioned and/or at least a portion of the weight thereof is otherwise distributed throughout the work machines 20 (e.g., on the lift base, on a portion of the boom, etc.). As shown in FIG. 11, a first end (e.g., front end) of the lift base is supported by a first plurality of tractive elements (e.g., wheels, etc.), and an opposing second end (e.g., rear end) of the lift base is supported by a second plurality of tractive elements (e.g., wheels). According to the exemplary embodiment shown in FIG. 11, the front tractive elements and the rear tractive elements include wheels; however, in other embodiments the tractive elements include a track element.

As shown in FIG. 11, the boom includes a first boom section (e.g., lower boom, etc.) and a second boom section (e.g., upper boom, etc.). In other embodiments, the boom includes a different number and/or arrangement of boom sections (e.g., one, three, etc.). According to an exemplary embodiment, the boom is an articulating boom assembly. In one embodiment, the upper boom is shorter in length than lower boom. In other embodiments, the upper boom is longer in length than the lower boom. According to another exemplary embodiment, the boom is a telescopic, articulating boom assembly. By way of example, the upper boom and/or the lower boom may include a plurality of telescoping boom sections that are configured to extend and retract along a longitudinal centerline thereof to selectively increase and decrease a length of the boom.

As shown in FIG. 11, the lower boom has a first end (e.g., base end, etc.) and an opposing second end (e.g., intermediate end). According to an exemplary embodiment, the base end of the lower boom is pivotally coupled (e.g., pinned, etc.) to the turntable at a joint (e.g., lower boom pivot, etc.). As shown in FIG. 11, the boom includes a first actuator (e.g., pneumatic cylinder, electric actuator, hydraulic cylinder, etc.), which has a first end coupled to the turntable and an opposing second end coupled to the lower boom. According to an exemplary embodiment, the first actuator is positioned to raise and lower the lower boom relative to the turntable about the lower boom pivot.

As shown in FIG. 11, the upper boom has a first end (e.g., intermediate end, etc.), and an opposing second end (e.g., implement end, etc.). According to an exemplary embodiment, the intermediate end of the upper boom is pivotally coupled (e.g., pinned, etc.) to the intermediate end of the lower boom at a joint (e.g., upper boom pivot, etc.). As shown in FIG. 11, the boom includes an implement (e.g., platform assembly) coupled to the implement end of the upper boom with an extension arm (e.g., jib arm, etc.). In some embodiments, the jib arm is configured to facilitate pivoting the platform assembly about a lateral axis (e.g., pivot the platform assembly up and down, etc.). In some embodiments, the jib arm is configured to facilitate pivoting the platform assembly about a vertical axis (e.g., pivot the platform assembly left and right, etc.). In some embodiments, the jib arm is configured to facilitate extending and retracting the platform assembly relative to the implement end of the upper boom. As shown in FIG. 11, the boom includes a second actuator (e.g., pneumatic cylinder, electric actuator, hydraulic cylinder, etc.). According to an exemplary embodiment, the second actuator is positioned to actuate (e.g., lift, rotate, elevate, etc.) the upper boom and the platform assembly relative to the lower boom about the upper boom pivot.

According to an exemplary embodiment, the platform assembly is a structure that is particularly configured to support one or more workers. In some embodiments, the platform assembly includes an accessory or tool configured for use by a worker. Such tools may include pneumatic tools (e.g., impact wrench, airbrush, nail gun, ratchet, etc.), plasma cutters, welders, spotlights, etc. In some embodiments, the platform assembly includes a control panel to control operation of the work machines 20 (e.g., the turntable, the boom, etc.) from the platform assembly. In other embodiments, the platform assembly includes or is replaced with an accessory and/or tool (e.g., forklift forks, etc.).

Figure 12:
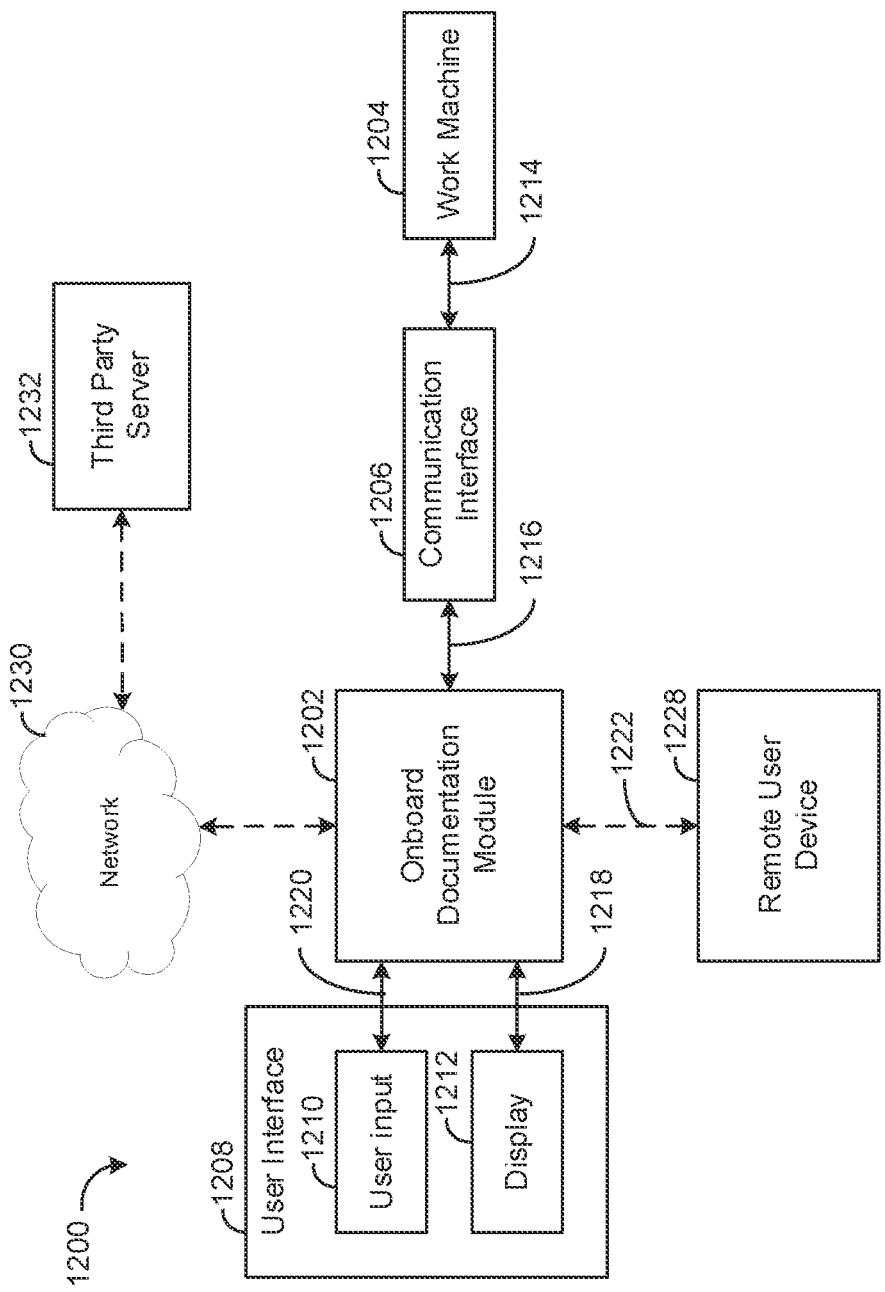
FIG. 12 is a block diagram of an onboard documentation system for a work machine, according to an exemplary embodiment.

As shown in FIG. 12, the onboard documentation system 1200 includes an onboard documentation module, shown as onboard documentation module 1202, configured to receive, store, and provide one or more documents related to a work machine, shown as work machine 1204. In some embodiments, the onboard documentation module 1202 is a component of a controller, such as controller 44 of FIG. 1. For example, the onboard documentation module may be a hardware processing circuit such as the processing circuit 48 of FIG. 1, and contain one or more processors and one or more non-transient memory devices configured to store instructions for the processor(s). In other embodiments, the onboard documentation module 1202 is a software module stored on local memory, such as memory 56. According to an exemplary embodiment, the onboard documentation module 1202 communicates with the work machine 1204 via the communication interface 1206. In other embodiments, the work machine 1204 communicates directly with the onboard documentation module 1202. As shown in FIG. 12, the onboard documentation module 1202 is also communicably connected to user interface 1208 including user input 1210 and display 1212. In some embodiments, the user interface 1208, user input 1210, and display 1212 are the same and/or similar to user interface 32, user input 36, and display 40 of FIG. 1. A user may request an electronic document, via, for example, user input 36. The documentation module provides a display of the requested electronic document via display 40 (which may be an on-board machine display) and/or a mobile device of a user (e.g., a smartphone, tablet, etc.)

According to the exemplary embodiment shown in FIG. 12, the onboard documentation module 1202 is connected to the work machine 1204, the communication interface 1206, and the user interface 1208 via wired connections 1214, 1216, 1218, and 1220, respectively. The wired connections may be connections internal to work machine 1204, such that the onboard documentation module 1202, the communication interface 1206, and the user interface 1208 are components installed or embodied in the work machine 1204. Still in other embodiments, connections 1214, 1216, 1218, and 1220 may be wireless, allowing one or more of the components to not be coupled directly to the work machine 1204.

As shown in FIG. 12, the onboard documentation module connects to a remote user device 1228 via a wireless connection 1222. According to an exemplary embodiment, the remote user device 1228 is configured to request and receive documents from the onboard documentation module. While the remote user device 1228 is shown to be directly connected to the onboard documentation module 1202, in some embodiments the remote user device 1228 connects to the onboard documentation module 1202 via the communication interface 1206. In some embodiments, the remote user device 1228 is a user interface of another work machine. For example, the remote user device 1228 may be a work machine connected to work machine 1204 via a local fleet connectivity system as described herein. A user of the remote user device 1228 may interact with the documentation stored on the onboard documentation module 1202 according to one or more access codes.

As shown in FIG. 12, the onboard documentation module connects to the third party server 1232 via the network 1230. In some embodiments, the network 1230 is a wireless network (e.g., BLE, WiFi, cellular, etc.). In some embodiments, the third party server 1232 is a the same and/or similar to the product development and application hub 244 shown in FIG. 2. According to an exemplary embodiment, the onboard documentation module 1202 communicates with the third party server 1232 and is configured to receive one or more documents for local storage. For example, the onboard documentation module 1202 may receive an updated version of a operators manual. For another example, the onboard documentation module 1202 may receive a new rental contract replacing an old rental contract that had previously expired. The work machine 1204 could then be transported directly to a new worksite according to the new rental contract without first having to be handled by the owner.

Figure 13:
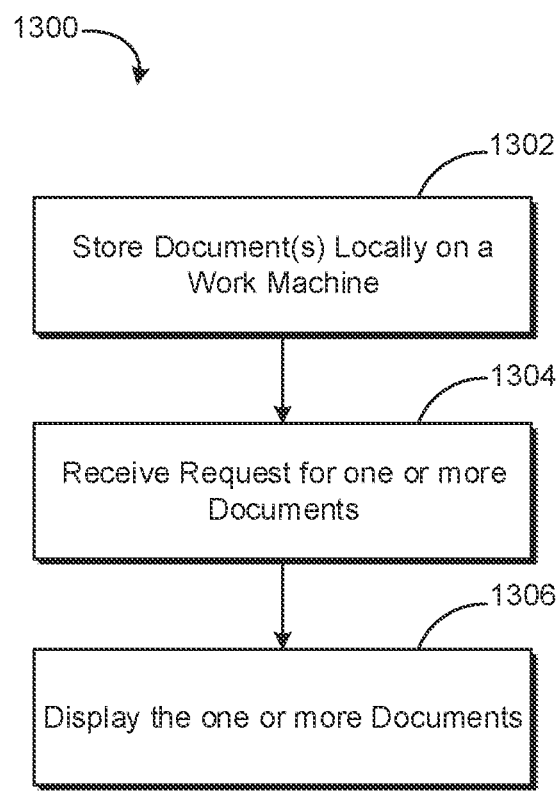
FIG. 13 is a flow diagram of a method for onboard documentation storage for a work machine, according to an exemplary embodiment.

Referring now to FIG. 13, an onboard document storage method for storing documentation onboard a work machine, shown as storage process 1300, is shown according to an exemplary embodiment. One or more of steps 1302, 1304, and 1306 may be performed by the controller 44 or the onboard documentation system 1200 discussed herein. At step 1302, one or more documents (e.g., documentation) are stored locally on a work machine, for example in memory 46 of user interface 32 shown in FIG. 1. The documentation may be received from a third party server, from a locally connected device, etc. The documentation may include technical literature, ownership records, maintenance records, access logs, rental agreements, manuals, marketing materials, etc. At step 1304, a request for one or more of the document(s) stored on locally on the work machine is received. According to an exemplary embodiment, the request is received by an onboard documentation system, and may be a user request (e.g., via a locally connected device) or may be generated automatically (e.g., in response to a maintenance task being generated, a machine state being detected, etc.). At step 1306, in response to the request, the one or more documents are displayed. In some embodiments, the documents may be displayed on a local display integrated into the work machine (e.g., display 40) and/or a display of a mobile device (e.g., a smartphone, tablet, etc.). As discussed herein, the documents may be a variety of types, and include various information for users to facilitate usage, maintenance, etc. of various machines.

Figure 14:
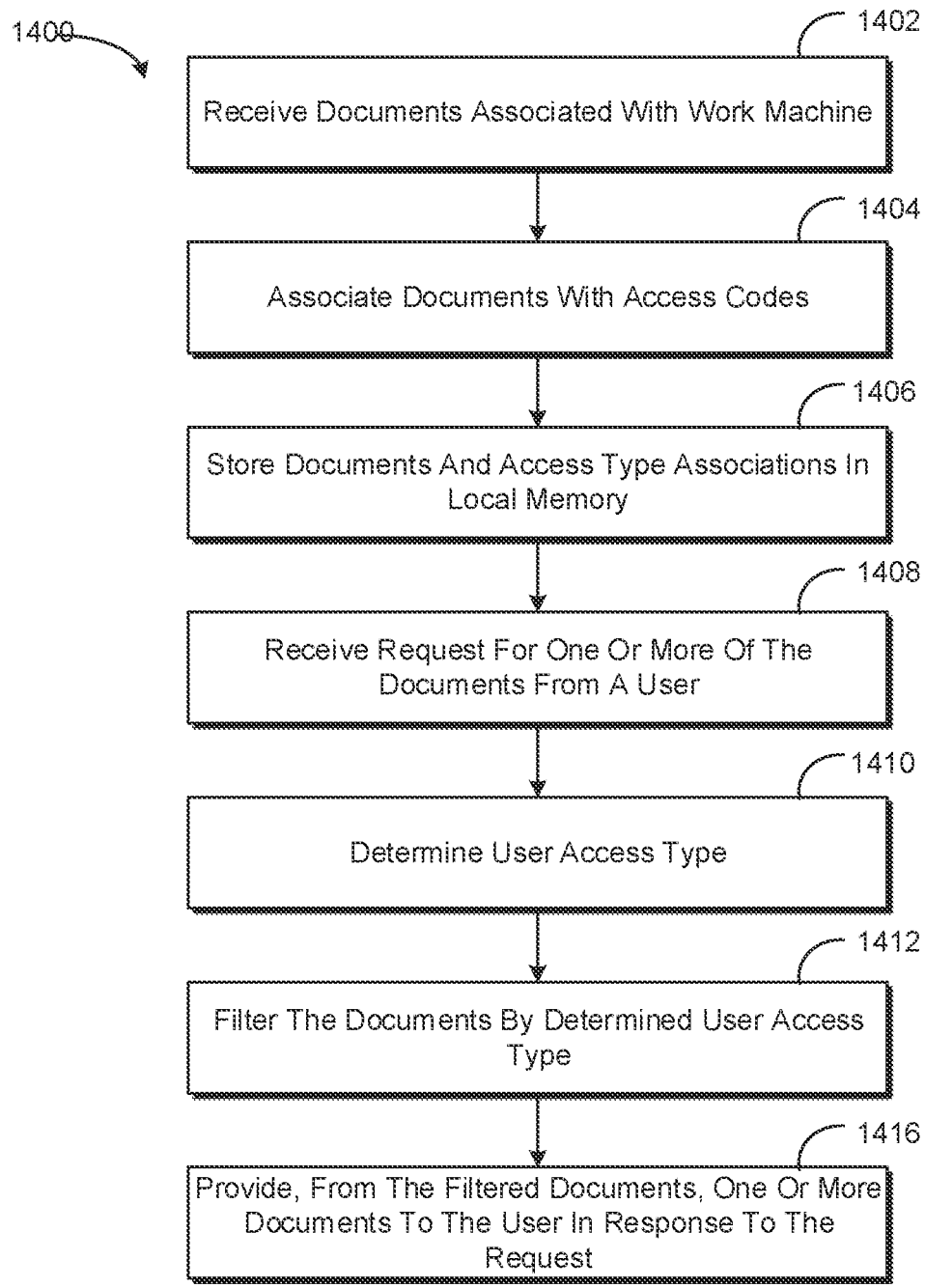
FIG. 14 is a flow diagram of a method for controlling access to onboard documentation in a work machine, according to an exemplary embodiment.

Referring now to FIG. 14, a process for controlling access to an onboard documentation system according to access codes is provided, shown as access control process 1400 according to an exemplary embodiment. For the purposes of explanation the below steps are discussed with respect to the onboard documentation system of FIG. 12, though one or more steps of access control process 1400 can alternatively be performed by an onboard documentation system operated by one or more controllers/modules, such as controller 44 and control system 60 as discussed above. Generally, each user accessing a work machine is associated with an access code (e.g., owner code, operator code, etc.). The access codes may be used to provide/limit how which documents of the onboard documentation system can be accessed by users associated with that code. In some embodiments, the access codes are tiered. For example, an operator may be able to access only documents associated with an operator access code, whereas an owner may be able to access all documents, both those associated solely with an owner access code as well as those associated with an operator access code.

At step 1402, the onboard documentation module 1202 of the work machine 1204 receives documentation associated with the work machine 1204 via the communications interface 1206. At step 1404, the onboard documentation module 1202 associates the one or more documents with a predetermined list of one or more access codes. There may be any number of access codes, and the list may be installed during manufacturing/provisioning or installed and/or updated post manufacturing. In some embodiments, the access codes represent an access type (e.g., customer, owner, manufacturer, servicer, etc.). According to an exemplary embodiments, the documents are associated with access codes according to a set of rules included in the onboard documentation module 1202 For example, documents containing proof of ownership information can be associated with an owner's access code, while documents containing service and repair information can be associated with a servicer's access code. The rules for association may be provided during manufacturing or provisioning, or may be chosen and installed by an owner. In some embodiments, a document can be associated with multiple access codes, for example maintenance, service, and compliance records can be available to operators, servicers, and owners. In some embodiments, the documents are already associated with an access code prior to being received by the onboard documentation module 1202, and step 1404 is skipped.

At step 1406 the documents and their associations with one or more access codes are stored in local memory onboard the work machine 1204. As discussed above, in some embodiments the onboard documentation module may be embodied within the work machine 1204. The onboard documentation module 1202 may also contain one or more memory devices similar to memory device 46 for storing the documentation. At step 1406 the documentation is stored in these memory device(s) locally on the work machine. Local storage allows the documents to be accessible at any time no matter the status of a networked connection to the work machine 1204.

At step 1408, the onboard documentation module 1202 receives a request for one or more of the documents from a user. In some embodiments, the user makes the request via the user input 1210 integrated with the work machine 1204. Still in other embodiments the request is received from a remote user connecting to the work machine 1204 and the onboard documentation module remotely via a wireless network. For example, the wireless network may be a local fleet connectivity system established by one or more work machines at a worksite, and the request may be generated and received from a remote user device such as remote user device 1228.

At step 1410, the onboard documentation module determines the user access type based on the request. According to an exemplary embodiment, requests received by the onboard documentation module 1202 are embedded and/or include an access code to indicate to the onboard documentation module 1202 which documents of the locally stored documentation the user is allowed access to. In some embodiments, when the request is sent from another work machine, the access code may be included by default. Still in other embodiments, a user may be instructed to provide the onboard documentation module 1202 with the access code in a first instance. The onboard documentation module 1202 may determine based on the access code a user's access type and which documents from the locally stored onboard documentation they are allowed to access.

At step 1412, the onboard documentation module 1202 filters the documentation by the user access type. At step 1416, the onboard documentation module 1202 provides, from the filtered documents, one or more documents to the user in response to the request.

Figure 15:
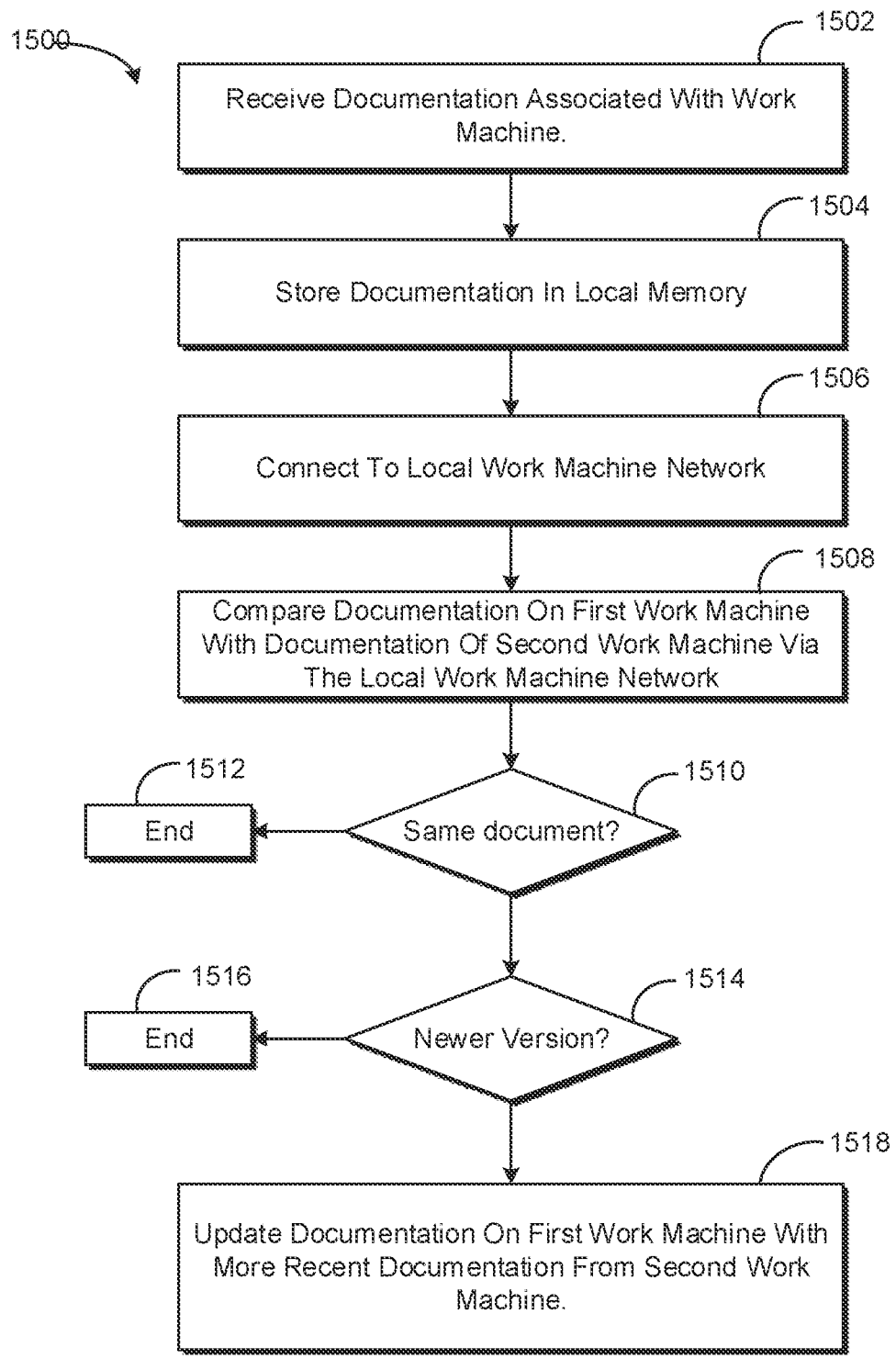
FIG. 15 is a flow diagram of a method for updating onboard documentation in a work machine via the local fleet connectivity system of FIG. 2, according to an exemplary embodiment.

Referring now to FIG. 15, a method for updating the documentation stored locally on a work machine, shown as update process 1500, is shown according to an exemplary embodiment. For the purposes of explanation the below steps are discussed with respect to the onboard documentation system of FIG. 12, though one or more steps of access control process 1400 can alternatively be performed by an onboard documentation system operated by one or more controllers/modules, such as controller 44 and control system 60 as discussed above. Generally, a work machine storing one or more documentations in local memory may be configured to update those documents to newer versions when connected to one or more other work machines containing the updated copies. In some embodiments, the work machines may establish their own local mesh network such as a local fleet connectivity system for distributing data, and can automatically compare information with one another to determine if any work machine has an updated version of the any document stored locally. The work machines can share the updated documents as required to provide for automatic updating in the field. In some embodiments, the method of FIG. 15 can be performed by work machines of the same manufacturer. Still in other embodiments, the method of FIG. 15 can be performed only by work machines of the same type.

At step 1502, the onboard documentation module 1202 of work machine 1204 receives documentation associated with the work machine 1204. As described above, this documentation may be any document related to the work machine or useful to an owner/operator, including service manuals, parts manuals, operator's manuals, marketing flyers, proof of ownership records, maintenance records, compliance records, access logs, use logs, contractual information, etc. At step 1504, the onboard documentation module stores the documentation in local memory onboard the work machine 1204. At step 1506, the onboard documentation module 1202 connects to a local work machine network such as a local fleet connectivity system 200. Still in other embodiments, the onboard documentation module 1202 connects to another type of network such as a BLE, WiFi, or cellular network. At step 1508, the onboard documentation module 1202 of the first work machine compares the documentation stored locally in its own memory with the documentation stored in the second work machine via the local work machine network. In some embodiments, before comparing documentation, the first work machine and the second work machine exchange one or more access codes. The access codes can serve a network security function and ensure unauthorized work machines cannot gain access to the locally stored documentation. For example, two work machines of the same manufacturer may be sold to two different companies. The work machines would then each have the same manufacturer codes but different owner access codes. In some embodiments, the work machines with the different owner access would still compare documentation, but only documentation associated with the manufacturer access code. Any documentation associated with the owners access code would not be shared.

At step 1510, the onboard documentation module 1202 checks if any of the documents from the second work machine are the same as on the first work machine 1204. If not, then the process ends at step 1512. If the documents are the same, the process proceeds to step 1514. At step 1514, the onboard documentation module checks if the same document from the second work machine is a newer version. If it is not a newer version then the process ends at step 1516. In some embodiments, when not a newer version, but in fact an older version, the onboard documentation module 1202 of the first work machine 1204 can in fact provide its version of the document to the second work machine, to facilitate the updating of the documents locally stored on the second work machine. If at 1514 the document of the second work machine is a newer version, that the method proceeds to step 1518 and the onboard documentation module 1202 of the first work machine updates the documentation with the more recent documentation from the second work machine.

Figure 16:
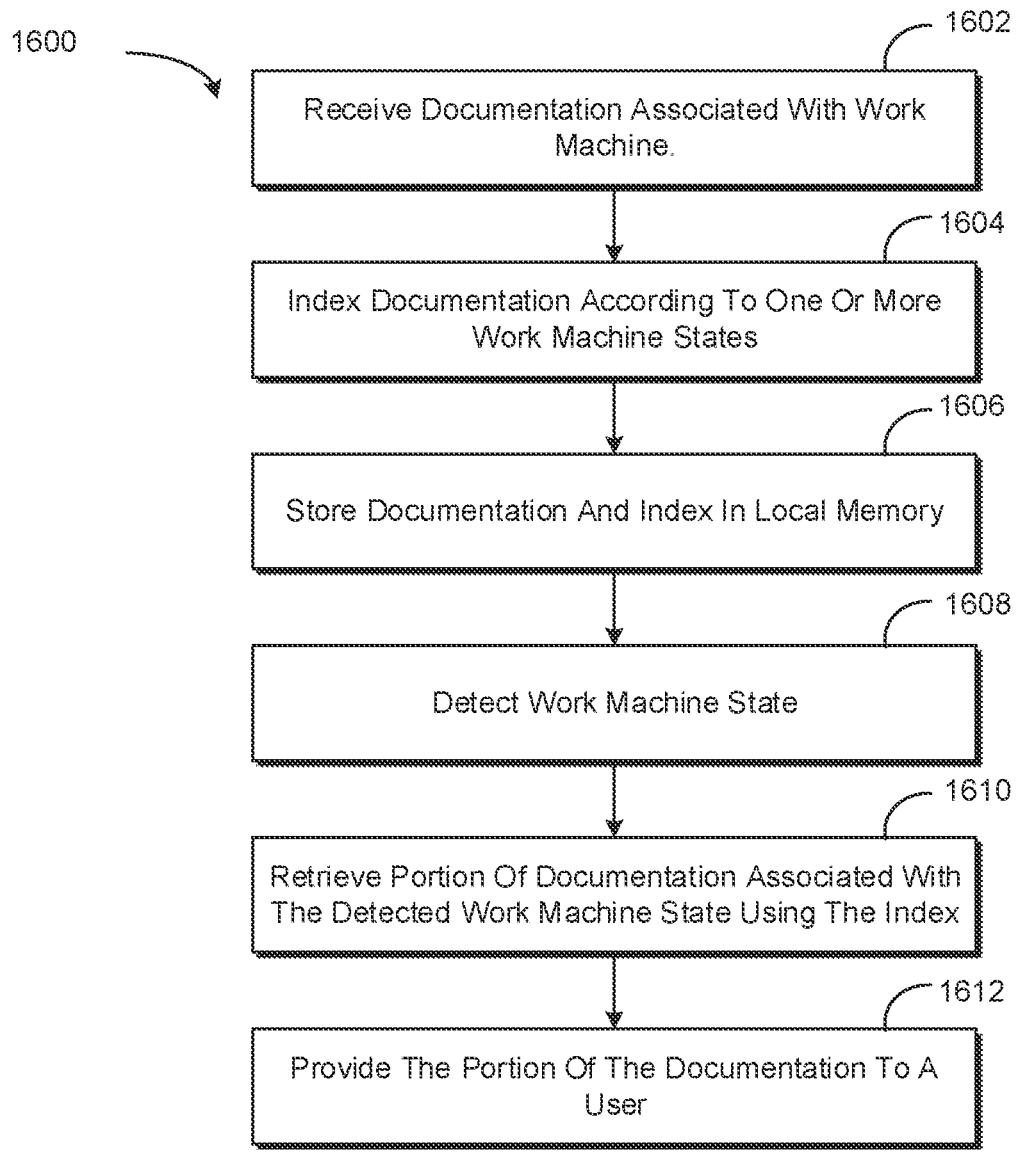
FIG. 16 is a flow diagram of a method of providing onboard documentation to a user in response to a detected work machine state, according to an exemplary embodiment.

Referring now to FIG. 16, a method for providing the documentation stored locally on a work machine to a user based on a work machine state, shown as delivery process 1600, is shown according to an exemplary embodiment. For the purposes of explanation the below steps are discussed with respect to the onboard documentation system of FIG. 12, though one or more steps of access control process 1400 can alternatively be performed by an onboard documentation system operated by one or more controllers/modules, such as controller 44 and control system 60 as discussed above. Generally, an onboard documentation system receives inputs from one or more sensors indicating a state for a work machine. The onboard documentation system includes documents associate with one or more machine states and is indexed in a searchable manner, such that when a machine state is detected the onboard documentation system may provide the portion of the documentation that is related to that machine state to a user. For example, if a low-tire pressure warning is received, the onboard documentation system may direct and/or provide a user to a portion of a service manual associated with low-tire pressure.

At step 1602, the onboard documentation module 1202 receives the documentation associated with the work machine 1204. At step 1604, the onboard documentation system indexes the documentation according to one or work machine states. The work machine states may be installed during manufacturing or provisioning of a work machine. In some embodiments, the work machine states are selected by a user. The documentation is indexed according to the work machine states to facilitate the efficient search for and retrieval of portions of the documentation associated with a work machine state as described in further detail below.

At step 1608, the onboard documentation module 1202 is configured to detect a work machine state of work machine 1204. Work machine states may include operating conditions, fault conditions, consumable levels, temperature, location, age, and/or any other state or position that may be sensed by one or more sensors of the work machine, such as sensor array 68. For example. the onboard documentation module 1202 may detect that a boom lift of a lift device is in an extended position. At step 1610, the onboard documentation module 1202 is configured to retrieve the portion of the documentation associated with the detected work machine state for work machine 1204 using the index. Continuing the previous example, when the machine state detected for a boom lift is that of the boom being extended, the onboard documentation system may automatically retrieve from the local onboard storage from the operator's manual instructions related to the operation of the boom lift, including how to return the boom lift to its normal operating position.

At step 1612, the onboard documentation module is configured to provide the portion of the documentation associated with the detected machine state to the user. In some embodiments, the documentation is provided to the user via an integrated display 1212 of a user interface 1208 in work machine 1204. In some embodiments, the documentation is provided to a remote user via a wireless network. For example, it may be provided to a user of another work machine via a connectivity module associated with a local fleet connectivity system.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIGS. 1-3, and 12, it should be understood that the controller 44 and the onboard documentation system 1202 may include any number of circuits for completing the functions described herein. For example, the activities and functionalities of the control system 60 may be combined in multiple circuits or as a single circuit. Additional circuits with additional functionality may also be included. Further, the controller 44 may further control other activity beyond the scope of the present disclosure.

As mentioned above and in one configuration, the "circuits" of the control system 60 may be implemented in machine-readable medium for execution by various types of processors, such as the processor 52 of FIG. 1. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Although this description may discuss a specific order of method steps, the order of the steps may differ from what is outlined. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. An onboard documentation system for a lift device comprising:
   a controller coupled to the lift device and configured to:
   receive documentation associated with the lift device, wherein the documentation comprises a plurality of documents, and wherein each of the plurality of documents is associated with at least one of a plurality of access codes;
   store the documentation locally on the lift device;
   receive a first request for the documentation from a first user;
   determine a first user access code for the first user;
   retrieve, from the plurality of documents, at least one document associated with an access code that matches the first user access code;
   provide to the first user, from the plurality of documents stored locally on the lift device, the at least one document associated with the access code that matches the first user access code in response to the first request;
   receive a second request for the documentation from a second user;
   determine a second user access code for the second user, the second access code different than the first user access code;
   retrieve, from the plurality of documents, at least one document associated with the second user access code; and
   provide to the second user, from the plurality of documents stored locally on the lift device, the at least one document associated with the second user access code in response to the second request.

2. The onboard documentation system of claim 1, wherein the plurality of documents comprises at least one of an operator's manual, a parts manual, or a service manual.

3. The onboard documentation system of claim 1, wherein the controller is further configured to control the operation of the lift device.

4. The onboard documentation system of claim 1, wherein the controller is further configured to receive the first request from the first user via a wireless network.

5. The onboard documentation system of claim 4, wherein the wireless network is a local short range wireless network.

6. The onboard documentation system of claim 4, wherein the wireless network is a local Bluetooth Low Energy (BLE) mesh network established by a plurality of lift devices on a work site.

7. The onboard documentation system of claim 1, wherein the controller is further configured to receive the documentation associated with the lift device from a remote server.

8. The onboard documentation system of claim 1, further comprising:
   a user interface communicably coupled to the controller and comprising a user input and a display, wherein the controller is further configured to:
   receive the first request for the documentation from the first user via the user input; and
   provide to the first user the at least one document associated with the access code that matches the first user access code in response to the first request via the display.

9. The onboard documentation system of claim 1, further comprising a sensor configured to acquire operation data of the lift device.

10. The onboard documentation system of claim 9, wherein the controller is further configured to:
    detect a lift device state using the operation data; and
    retrieve, from the plurality of documents, the least one document associated with the access code that matches the first user access code and with the operation data.

11. A method for providing onboard documentation associated with a lift device to a user, the method comprising:
    providing a lift device comprising a local memory device;
    storing, on the local memory device, documentation associated with the lift device, wherein the documentation comprises a plurality of documents, and wherein each of the plurality of documents is associated with at least one of a plurality of access codes;

receiving from a first user, a first request for the documentation at the local memory device;

determining a first user access code for the first user based on the first request;

retrieving, from the plurality of documents, at least one document associated with an access code that matches the first user access code;

providing, to the first user, from the plurality of documents, the at least one document associated with the access code that matches the first user access code;

receiving from a second user, a second request for the documentation at the local memory device;

determining a second user access code for the second user based on the second request;

retrieving, from the plurality of documents, at least one document associated with the second user access code; and providing, to the second user, from the plurality of documents, the at least one document associated with the second user access code.

12. The method of claim 11, wherein the plurality of documents comprises at least one of an operator's manual, a parts manual, or a service manual.

13. The method of claim 11, further comprising receiving from the first user, a control request to control an operation of the lift device.

14. The method of claim 11, further comprising receiving from the first user the first request for the documentation via a wireless network.

15. The method of claim 14, wherein the wireless network is a local short range wireless network.

16. The method of claim 14, wherein the wireless network is a local Bluetooth Low Energy (BLE) mesh network established by a plurality of lift devices on a work site.

17. The method of claim 11, further comprising receiving the documentation associated with the lift device from a remote server.

18. The method of claim 11, further comprising:
receiving from the first user the first request for the documentation through a user interface of the lift device; and
providing, through a display of the user interface, the at least one document associated with the access code that matches the first user access code in response to the first request.

19. The method of claim 11, further comprising sensing, via a sensor coupled to the lift device, operation data of the lift device.

20. The method of claim 19, further comprising:
detecting a lift device state using the operation data; and
retrieving, from the plurality of documents, the least one document associated with the access code that matches the first user access code and with the operation data.

* * * * *